(12) United States Patent
Lee et al.

(10) Patent No.: US 10,525,672 B2
(45) Date of Patent: Jan. 7, 2020

(54) WINDOW MEMBER AND METHOD FOR FABRICATING DISPLAY DEVICE

(71) Applicant: Samsung Display Co., Ltd., Yongin-si, Gyeonggi-do (KR)

(72) Inventors: Jung A Lee, Osan-si (KR); Dong Sup Kim, Hwaseong-si (KR); Ju Suk Oh, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/102,590

(22) Filed: Aug. 13, 2018

(65) Prior Publication Data
US 2019/0077121 A1 Mar. 14, 2019

(30) Foreign Application Priority Data
Sep. 13, 2017 (KR) .................. 10-2017-0116912

(51) Int. Cl.

| | |
|---|---|
| *B32B 17/10* | (2006.01) |
| *B32B 37/06* | (2006.01) |
| *B32B 7/06* | (2019.01) |
| *H04M 1/02* | (2006.01) |
| *B32B 7/12* | (2006.01) |
| *G06F 1/12* | (2006.01) |
| *B32B 38/10* | (2006.01) |

(52) U.S. Cl.
CPC .............. *B32B 17/10* (2013.01); *B32B 7/06* (2013.01); *B32B 7/12* (2013.01); *B32B 37/06* (2013.01); *G06F 1/12* (2013.01); *H04M 1/0202* (2013.01); *B32B 38/10* (2013.01)

(58) Field of Classification Search
CPC ...................................................... B32B 17/10
USPC ........................................................... 428/38
See application file for complete search history.

(56) References Cited

U.S. PATENT DOCUMENTS

2011/0212661 A1* 9/2011 Lee .................... G06F 3/044
445/24

FOREIGN PATENT DOCUMENTS

| KR | 10-2014-0092138 A | 7/2014 |
|---|---|---|
| KR | 10-1760701 B1 | 7/2017 |

* cited by examiner

*Primary Examiner* — Brent T O'Hern
(74) *Attorney, Agent, or Firm* — Lewis Roca Rothgerber Christie LLP

(57) ABSTRACT

Provided are a window member and a method for fabricating a display device. A window member may include: a base substrate, and a printed pattern along a periphery of a surface of the base substrate; and a first protective film on the surface of the window and including a first film layer, a first adhesive layer on the first film layer, and a first edge masking pattern on the first adhesive layer along an edge of the first adhesive layer. A method may include: preparing a window member in which a protective film is attached to a surface of a window; and peeling off the protective film from the window, the protective film including a film layer, an adhesive layer on the film layer, and an edge masking pattern on the adhesive layer along an edge of the adhesive layer.

20 Claims, 22 Drawing Sheets

WINDOW MEMBER AND METHOD FOR FABRICATING DISPLAY DEVICE

CROSS-REFERENCE TO RELATED APPLICATION

This application claims priority to and the benefit of Korean Patent Application No. 10-2017-0116912, filed on Sep. 13, 2017 in the Korean Intellectual Property Office, the entire disclosure of which is incorporated herein by reference.

BACKGROUND

1. Field

Aspects of embodiments of the present disclosure relate to a window member and a method of fabricating a display device.

2. Description of the Related Art

Display devices display images and include a display panel, such as an organic light-emitting display panel or a liquid-crystal display panel. Such a display device may include a window for protecting the display panel from an external impact. In particular, the window is frequently employed by portable electronic devices, such as smartphones.

A protective film is attached on either side of the window so as to protect the window while it is moved and loaded. When the window is attached to a display panel, the protective film is peeled off and removed. The protective film includes an adhesive layer, which may become a foreign material if the adhesive layer comes in contact with a particular location of the surface of the window. In addition, the adhesive material may remain on the surface of the window after the protective film is peeled off. Sometimes, such a residual material may cause malfunction of the display device.

SUMMARY

According to an aspect of the present disclosure, a window member is provided in which contamination caused when an adhesive material of a protective film comes in contact with a surface of a window or remains on it may be prevented.

According to another aspect of the present disclosure, a method is provided for fabricating a display device in which contamination caused when an adhesive material of a protective film comes in contact with a surface of a window or remains on it may be prevented.

According to another aspect of the present disclosure, a method is provided for fabricating a display device in which a protective film for a window can be easily peeled off.

These and other aspects, embodiments, and advantages of the present disclosure will be readily apparent to those of ordinary skill in the art upon review of the following detailed description and claims.

According to an exemplary embodiment of the present disclosure, an edge masking pattern covers an outer edge of a protective film adhesive layer in a window member, such that an adhesive material does not reach an edge of a window when the protective film is attached to the window. Accordingly, it is possible to block the adhesive material from flowing down to the side surface of the window, thereby preventing or substantially preventing contamination on the side surface of the window.

In addition, according to an exemplary embodiment of the present disclosure, an opening masking pattern of the window member may eliminate or reduce the possibility that the adhesive material remains at an area where a camera or sensor is disposed, thereby preventing or substantially preventing malfunction of the camera or sensor due to foreign matter. Further, according to an exemplary embodiment of the present disclosure, it is possible to suppress peeling, even with a masking pattern, and prevent or substantially prevent detaching of the window member.

It is noted that aspects and effects of the present disclosure are not limited to those described above, and other aspects and effects of the present disclosure will be apparent to those skilled in the art from the following description.

According to an exemplary embodiment of the present invention, a window member includes: a window including a base substrate, and a printed pattern along a periphery of a surface of the base substrate; and a first protective film on the surface of the window and including a first film layer, a first adhesive layer on the first film layer, and a first edge masking pattern on the first adhesive layer along an edge of the first adhesive layer.

In an exemplary embodiment, the first adhesive layer may have a rectangular shape with longer sides and shorter sides, and wherein the first edge masking pattern is extended along an edge of at least one of the longer sides of the first adhesive layer.

In an exemplary embodiment, the first edge masking pattern may be extended to edges of the shorter sides of the first adhesive layer.

In an exemplary embodiment, an outer side surface of the first edge masking pattern may be aligned with a side surface of the first adhesive layer or may be located more to an outside than the side surface of the first adhesive layer.

In an exemplary embodiment, a thickness of the first edge masking pattern may be from 0.1 to 10 μm.

In an exemplary embodiment, a width of the first edge masking pattern may be from 0.5 to 1.5 mm.

In an exemplary embodiment, the first edge masking pattern includes a UV curable ink.

In an exemplary embodiment, the first edge masking pattern may be printed directly on the first adhesive layer.

In an exemplary embodiment, the first adhesive layer exposed by the first edge masking pattern may be coupled with the surface of the window, and the first edge masking pattern may not be coupled with the surface of the window.

In an exemplary embodiment, the printed pattern may include an opening, and the first protective film may further include an opening masking pattern arranged on the first adhesive layer to cover the opening of the printed pattern.

In an exemplary embodiment, the window may further include a window hole that penetrates the base substrate and the printed pattern, and the first protective film further may include a window hole masking pattern arranged on the first adhesive layer to cover the window hole.

In an exemplary embodiment, the window may further include a second protective film on another surface of the window, and the second protective film may include a second film layer, a second adhesive layer on the second film layer, and a second edge masking pattern on the second adhesive layer along an edge of the second adhesive layer.

According to another exemplary embodiment of the present invention, a window member includes a window; and a first protective film on a surface of the window and including a first film layer, a first adhesive layer on the first film layer, and a first masking pattern on the first adhesive layer and having a thickness of 0.1 to 10 μm.

In an exemplary embodiment, the window may include a base substrate, and a printed pattern along a periphery of a surface of the base substrate, and the first masking pattern may include an opening masking pattern covering an opening in the printed pattern.

In an exemplary embodiment, the first masking pattern may further include an edge masking pattern along an edge of the first adhesive layer.

In an exemplary embodiment, the window may further include a second protective film on another surface of the window, and the second protective film may include a second film layer, a second adhesive layer on the second film layer, and a second masking pattern on the second adhesive layer along an edge of the second adhesive layer.

In an exemplary embodiment, the first masking pattern may include a UV curable ink.

In an exemplary embodiment, the first masking pattern may be printed directly on the first adhesive layer.

According to another exemplary embodiment of the present invention, a method for fabricating a display device includes: preparing a window member in which a protective film is attached to a surface of a window; and peeling off the protective film from the window, wherein the protective film includes a film layer, an adhesive layer on the film layer, and an edge masking pattern on the adhesive layer along an edge of the adhesive layer.

In an exemplary embodiment, the preparing the window member may include preparing the protective film, and attaching the protective film to the surface of the window, and the preparing the protective film may include preparing a film in which the adhesive layer is arranged on an entire surface of the film layer, and printing a UV curable ink on the adhesive layer to form the edge masking pattern.

BRIEF DESCRIPTION OF THE DRAWINGS

The above and other aspects and features of the present disclosure will become more apparent by describing in further detail some exemplary embodiments thereof with reference to the attached drawings, in which.

DETAILED DESCRIPTION

Figure 1:
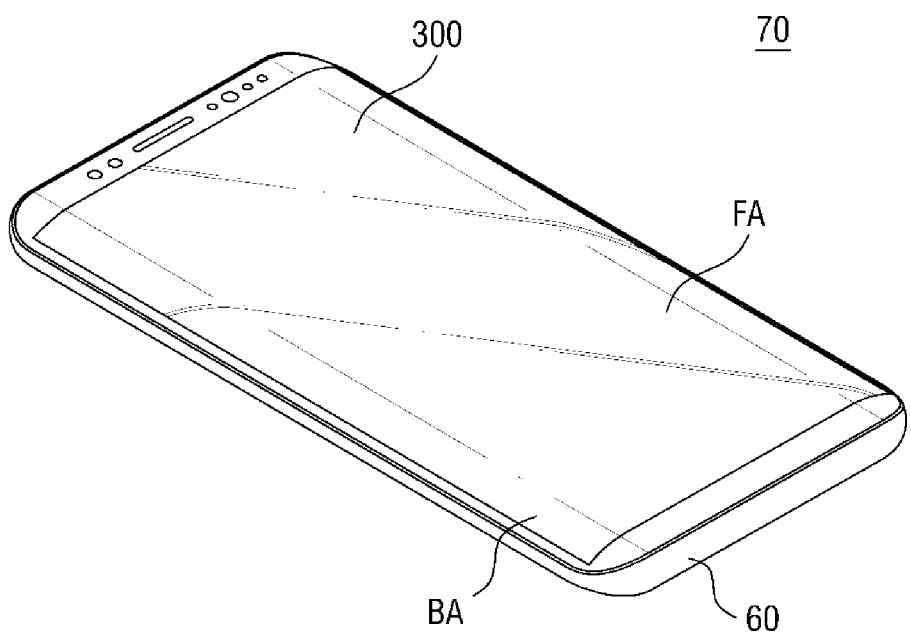
FIG. 1 is a perspective view of a display device according to an exemplary embodiment of the present disclosure.

Aspects and features of the present invention and methods for achieving the aspects and features will be apparent by referring to some exemplary embodiments to be described in further detail with reference to the accompanying drawings. However, the present invention is not limited to the embodiments disclosed herein, but can be implemented in diverse forms. Matters defined in the description, such as the detailed construction and elements, are provided to assist those of ordinary skill in the art in a comprehensive understanding of the present invention, but are not limiting of the present invention which is defined within the scope of the appended claims.

The term "on" that is used to designate that an element is on another element or located on a different layer or a layer includes both a case in which an element is located directly on another element or a layer and a case in which an element is located on another element via another layer or still another element. In the description of the present invention, the same drawing reference numerals are used for the same or similar elements across various figures.

Although the terms "first," "second," and so forth are used to describe constituent elements, such constituent elements are not limited by the terms. Rather, the terms are used to distinguish a constituent element from other constituent elements. Accordingly, in the following description, a first constituent element may be a second constituent element.

Herein, embodiments will be described with reference to the accompanying drawings.

Figure 2:
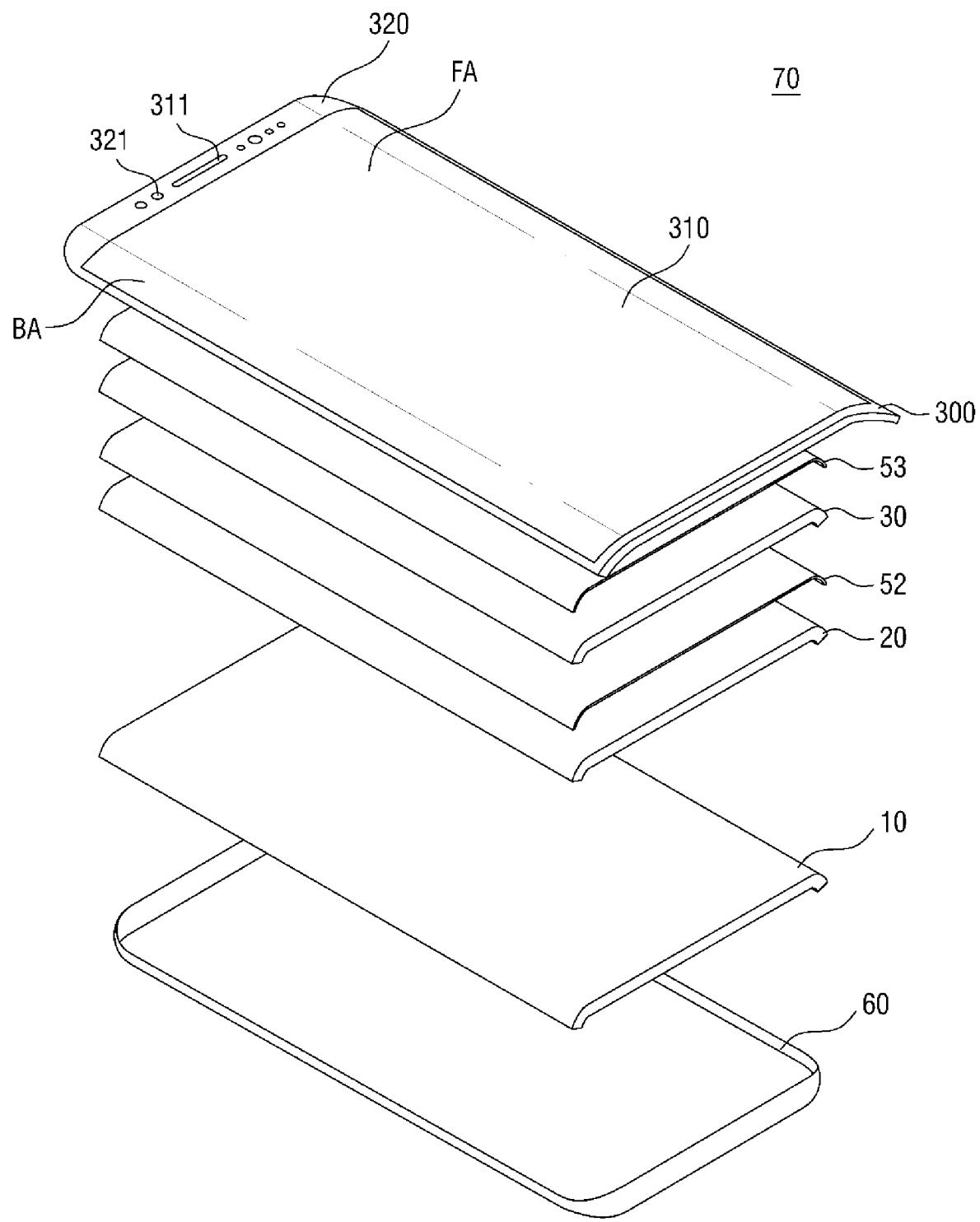
FIG. 2 is an exploded perspective view of the display device shown in FIG. 1.

FIG. 1 is a perspective view of a display device according to an exemplary embodiment of the present disclosure; and FIG. 2 is an exploded perspective view of the display device shown in FIG. 1.

Referring to FIGS. 1 and 2, a display device 70 includes a display panel 20 and a window 300 disposed above the display panel 20. The display device may further include a sheet 10 disposed under the display panel 20 and a bracket 60 disposed under the sheet 10.

In an embodiment, the display device 70 may have a rectangular shape when viewed from the top. The display device 70 may include two longer sides and two shorter sides. In an embodiment, the corners where the longer sides and the shorter sides of the display device 70 meet may form a right angle, although the corners may be rounded, as shown in FIG. 1. The shape of the display device 70 when viewed from the top is not limited to that shown in the drawings. For example, the display device 70 may have a circular shape or another shape.

The display panel 20 is for displaying a screen. For example, an organic light-emitting display panel may be employed. In the following description, the organic light-emitting display panel is employed as the display panel 20. It is to be understood, however, that other types of display panels, such as a liquid-crystal display panel and an electrophoretic display panel, may also be employed.

In an embodiment, the display panel 20 includes a plurality of organic light-emitting elements disposed on a substrate. The substrate may be a rigid substrate made of glass or the like, or a flexible substrate made of polyimide or the like. When the flexible substrate is used as the substrate, the display panel 20 may be curved, bent, folded, or rolled.

The display panel 20 may include a display area and a non-display area. The display area may be disposed substantially at the center, while the non-display area may be disposed around the display area. The non-display area may be extended along a periphery of the display panel.

A window 300 is disposed on the display panel 20. The window 300 is disposed on the display panel 20 to protect the display panel 20 and transmit the light exiting from the display panel 20.

The window 300 may be disposed to overlap the display panel 20 and cover the entire surface of the display panel 20. The window 300 generally has a shape similar to that of the display panel 20 and may be larger than the display panel 20. For example, the window 300 may protrude outwardly from the shorter sides of the display panel 20. The window 300 may also protrude from the display panel 20 at the longer sides of the display panel 20. The window 300 may protrude more at the shorter sides than at the longer sides. In an embodiment, the window 300 may have a rectangular shape including two longer sides and two shorter sides, corresponding to the shape of the display device 70, when viewed from the top.

The window 300 includes a first surface and a second surface. When the window 300 is mounted on the display device 70, the first surface of the window 300 refers to the surface facing the display panel, while the second surface of the window 300 refers to the surface functioning as a screen.

The window 300 may include a base substrate 310 and a printed pattern 320. The printed pattern 320 is disposed on a surface of the base substrate 310 such that the second surface of the window 300 may be composed of the base substrate 310 and the printed pattern 320. On the other hand, the first surface of the window 300 may be formed only of the base substrate 310 without the printed pattern 320.

The base substrate 310 may be made of a transparent material. The base substrate 310 may include, for example, glass or plastic. When the base substrate 310 includes plastic, the base substrate 310 may have flexibility.

Examples of plastics applicable to the base substrate 310 may include, but are not limited to, polyimide, polyacrylate, polymethylmethacrylate (PMMA), polycarbonate (PC), polyethylenenaphthalate (PEN), polyvinylidene chloride, polyvinylidene difluoride (PVDF), polystyrene, ethylene vinylalcohol copolymer, polyethersulfone (PES), polyetherimide (PEI), polyphenylene sulfide (PPS), polyallylate, triacetyl cellulose (TAC), cellulose acetate propionate (CAP), and the like. If the base substrate 310 includes plastic, it may further include coating layers (not shown) disposed on the upper and lower surfaces of the plastic. In an exemplary embodiment, the coating layers may be a hard coating layer including an organic layer containing an acrylate compound and/or an organic-inorganic hybrid layer. The organic layer may include an acrylate compound. The organic-inorganic hybrid layer may be a layer in which an inorganic material, such as silicon oxide, zirconium oxide, aluminum oxide, tantalum oxide, niobium oxide, and glass beads, is dispersed in an organic material, such as an acrylate compound. In another exemplary embodiment, the coating layer may include a metal oxide layer. The metal oxide layer may include, but is not limited to, any of metal oxides such as titanium, aluminum, molybdenum, tantalum, copper, indium, tin, and tungsten.

The printed pattern 320 is disposed on a surface of the base substrate 310. The printed pattern 320 may be disposed along the periphery of the base substrate 310. The printed pattern 320 is disposed to overlap with the non-display area of the display panel 20, thereby hiding the non-display area of the display panel 20. In addition, the printed pattern 320 may have an achromatic color, such as white, gray, and black, or a chromatic color, such as red, blue, and green, and may have any of various other colors or patterns to achieve aesthetic effects. The printed pattern 320 may be formed, for example, by screen printing, inkjet printing, gravure printing, or offset printing an ink composition containing a dye or a pigment. The printed pattern 320 may be formed by single-tone printing, which is single layer printing, or by two-tone printing, three-tone printing, or the like, which is multi-layer printing.

In an embodiment, the width of the printed pattern 320 is larger at the edges of the shorter sides than at the edges of the longer sides. The printed pattern 320 may include openings 321 via which a camera, an iris recognition camera, an infrared sensor, etc. are exposed. The openings 321 in the printed pattern 320 may be formed having, for example, a circular shape, an ellipse shape, a linear shape, etc.

In an embodiment, the openings 321 may be formed in the printed pattern 320 at the edge of the shorter side, which is relatively thick. Although the openings 321 are shown in the drawings being formed in the printed pattern 320 at the edge of the upper shorter side, the openings 321 may be formed in the printed pattern 320 at the edge of the lower shorter side or in the printed pattern 320 at the edge of the longer side, as desired. Since the ink material of the printed pattern 320 is not applied on the openings 321, a surface of the base substrate 310 is directly exposed without being covered by the printed pattern 320. Accordingly, a camera, a sensor, etc. may receive input information via the openings 321.

Figure 16:
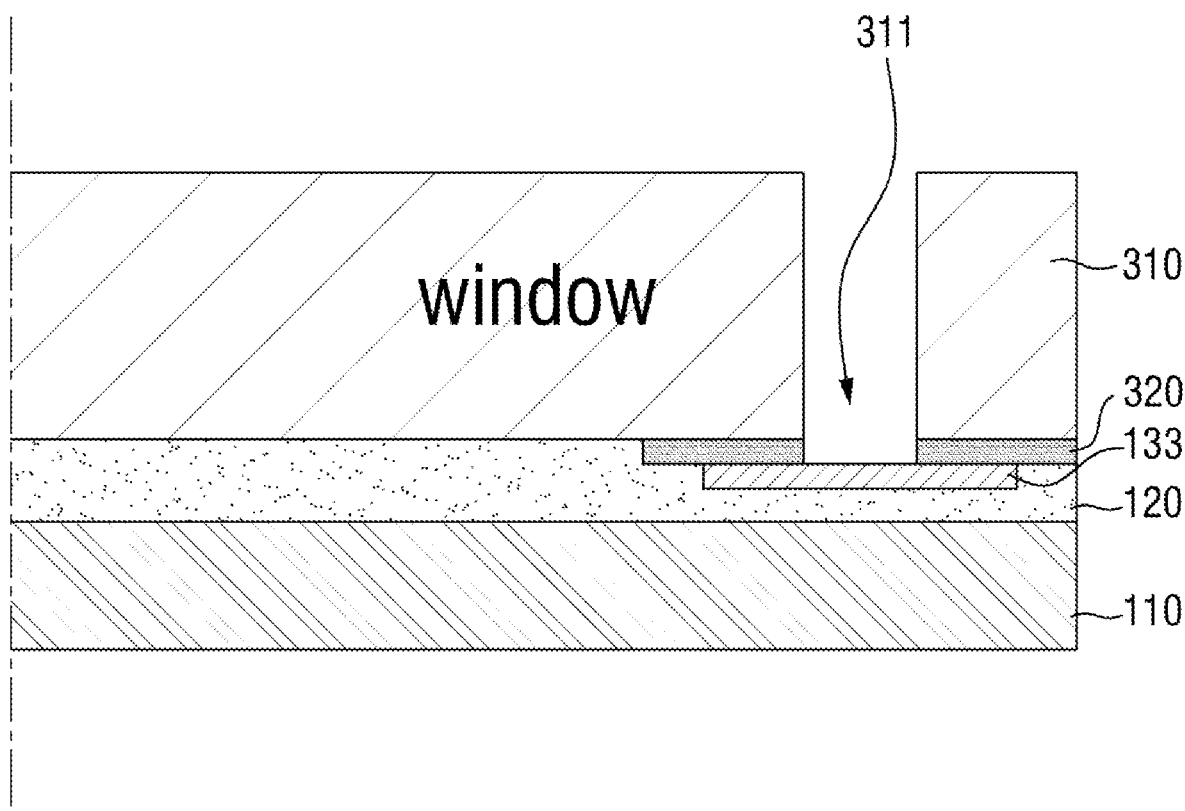
FIG. 16 is a cross-sectional view of the first protective film attached to the window of FIG. 15, taken along the line XVI-XVI'.

The window 300 may further include a window hole 311 penetrating the base substrate 310 and the printed pattern 320. For example, a speaker, a receiver, a camera, a communications module, a chip, or a sensor may be disposed in the window hole 311. A cross-sectional structure of the window hole 311 is shown in FIG. 16.

In an exemplary embodiment, a touch member 30 may be disposed between the display panel 20 and the window 300. The touch member 30 may be of a rigid panel type, a flexible panel type, or a film type. The display panel 20 may be coupled with the touch member 30 by a transparent coupling layer 52, and the touch member 30 may be coupled with the window 300 by a transparent coupling layer 53. In an embodiment, the transparent coupling layers 52 and 53 may include an optical transparent adhesive (OCA) and an optical transparent resin (OCR). In an embodiment, the touch member 30 may be omitted. When there is no touch member, the display panel 20 may be coupled with the window 300 by an optical transparent adhesive (OCA), an optical transparent resin (OCR), or the like. In another exemplary embodiment of the present disclosure, the display panel 20 may include a touch electrode structure.

The sheet 10 may be disposed under the display panel 20. The sheet 10 may include a top coupling layer at its top and may be attached to the lower surface of the display panel 20 thereby.

The sheet 10 may have substantially the same size as the display panel 20 and may overlap with the display panel 20. The sheet 10 may perform any of a heat dissipation function, electromagnetic wave shielding function, pattern hiding function, grounding function, buffering function, strength enhancing function and/or digitizing function. The sheet 10 may include a functional layer having at least one of the above-described functions. The functional layer may be provided in a variety of forms, such as a layer, a film, a sheet, a plate, and a panel.

The bracket 60 may be disposed under the sheet 10 to accommodate the window 300, the touch member 30, the display panel 20, the sheet 10 (e.g., a panel lower sheet), and the like.

In an exemplary embodiment, the display device 70 may include a flat area FA and a bending area BA that is connected to the flat area FA and positioned on the side of the flat area FA. The flat area FA is located generally on one plane. The bending area BA is not disposed on the same plane as the flat area FA. For example, the bending area BA may be bent or curved downwardly from the plane where the flat area FA is located.

In an exemplary embodiment, the bending area BA may include a convex surface that is curved outwardly. In another exemplary embodiment, the bending area BA may have a flat surface, and the flat surface of the bending area BA may be located on a plane having an angle (e.g., a predetermined angle) with the plane of the flat area FA.

In an embodiment, the bending area BA may be disposed on two longer sides or one of the longer sides of the rectangular display device 70. However, although not shown in the drawings, the shorter sides of the display device 70 may also be bent.

The display panel 20, the touch member 30, the window 300, the sheet 10, and the bracket 60 may all be positioned across the flat area FA and the bending area BA.

Unlike that shown in FIGS. 1 and 2, the display device may be a flat display device having a flat area only with no bending area. In the following description, the shape of a flat display device will be described as an exemplary embodiment for convenience of illustration, instead of separately describing a bent display device and a flat display device. It is, however, to be understood that the exemplary embodiments of the present disclosure can be equally applied to a variety of flexible display devices, such as bent display devices as well as flat display devices.

Herein, a window member according to an exemplary embodiment of the present disclosure will be described.

Figure 3:
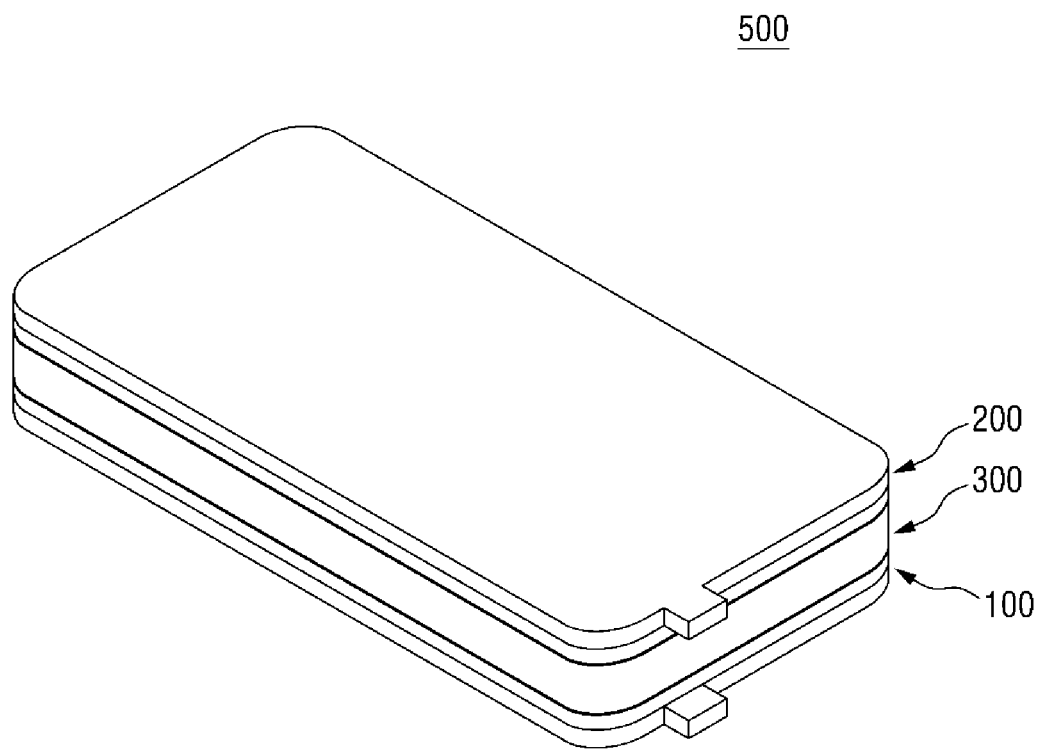
FIG. 3 is a perspective view of a window member according to an exemplary embodiment of the present disclosure.
Figure 4:
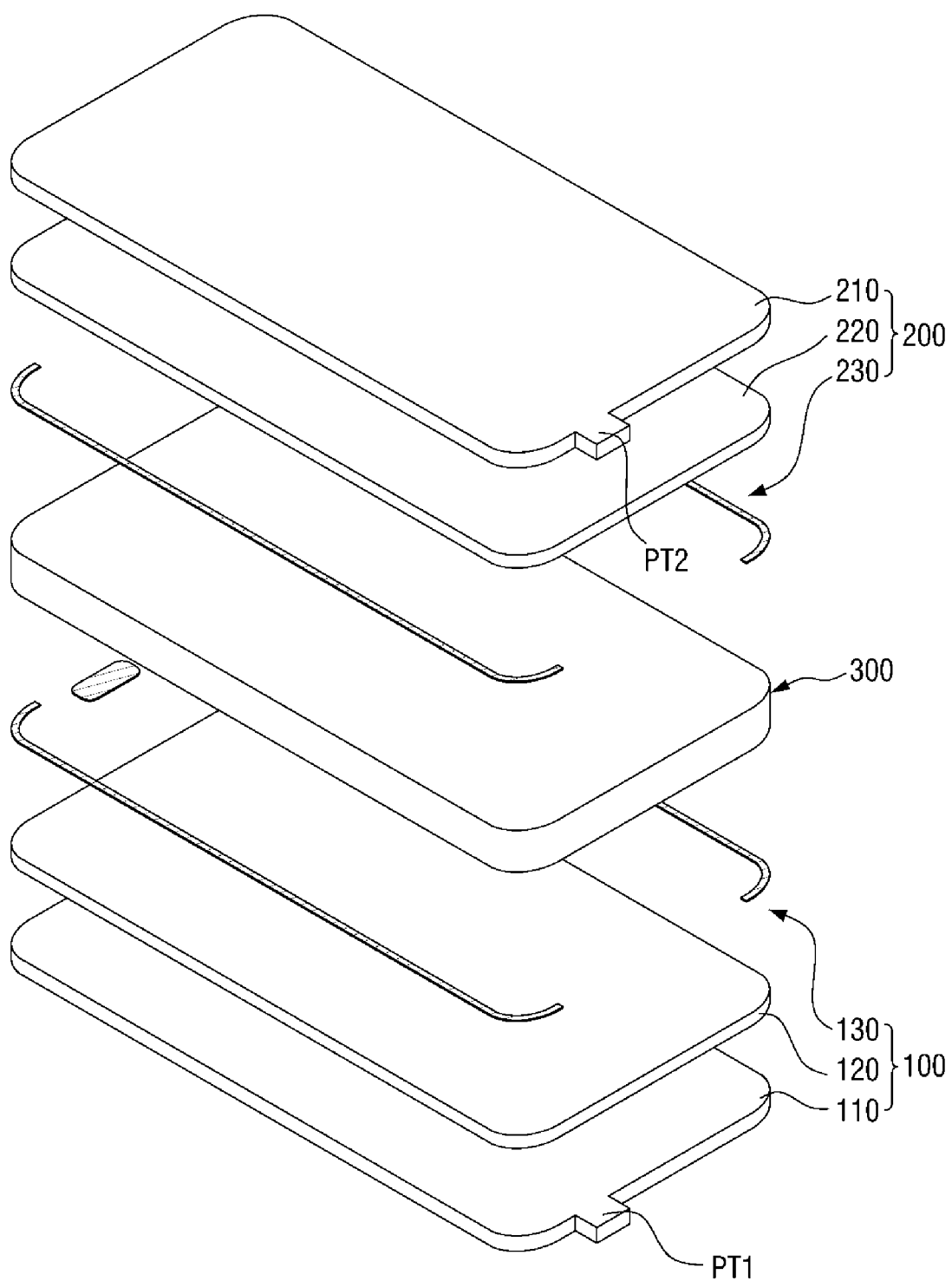
FIG. 4 is an exploded perspective view of the window member of FIG. 3.

FIG. 3 is a perspective view of a window member according to an exemplary embodiment of the present disclosure; and FIG. 4 is an exploded perspective view of the window member of FIG. 3.

Referring to FIGS. 3 and 4, a window member 500 includes a window 300, a first protective film 100, and a second protective film 200.

The first protective film 100 is disposed on the first surface of the window 300, while the second protective film 200 is disposed on the second surface of the window 300. The first protective film 100 and the second protective film 200 are attached to the window 300 to protect both sides of the window 300 while the window 300 is moved and loaded, and are peeled off and removed while the window 300 is mounted on a display panel or a touch member. In an embodiment, the general shape of the first protective film 100 and the second protective film 200 may be the same as the shape of the window 300 when viewed from the top.

The first protective film 100 includes a first film layer 110, a first adhesive layer 120, and a first masking pattern 130. The second protective film 200 includes a second film layer 210, a second adhesive layer 220, and a second masking pattern 230.

The first film layer 110 and the second film layer 210 cover the first surface and the second surface of the window 300, respectively. The first film layer 110 and the second film layer 210 may have covers overlapped with the window 300 and at least one pull-tab PT1 and PT2 protruding outwardly from the covers, respectively.

The first film layer 110 and the second film layer 210 may have the same shape as or a substantially similar shape as the window 300 except for the pull-tabs PT1 and PT2 and may overlap with the window 300 to generally cover it (e.g., as a cover unit). The first pull-tab PT1 of the first film layer 110 and the second pull-tab PT2 of the second film layer 210 protrude outwardly from the window 300 when viewed from the top. Accordingly, when the first film layer 110 and the second film layer 210 are peeled off, it is easy to hold the first protective film 100 and the second protective film 200 by grasping the first pull-tab part PT1 and the second pull-tab part PT2. Therefore, the process of peeling off the first and second protective films 100 and 200 can be carried out quickly.

Although it is shown in the drawings that the single first pull-tab PT1 and the single second pull-tab PT2 are disposed on the lower shorter sides, the number and positions of the first pull-tab PT1 and the second pull-tab PT2 are not particularly limited. The number and position of the first pull-tab PT1 may be different from those of the second pull-tab PT2. It is noted that the pull-tabs PT1 and PT2 may be omitted if the edges of the first protective film 100 or the second protective film 200 are not attached to the window 300 by the first or second masking patterns 130 and 230 such that they can be peeled off by using it, which will be described later.

Each of the first film layer 110 and the second film layer 210 may be made of any of polyethylene terephthalate (PET), polyurethane (PU), polyimide (P1), polycarbonate (PC), polyethylene (PE), polypropylene (PP), polysulfone (PSF), polymethylmethacrylate (PMMA), triacetylcellulose (TAC), cycloolefin polymer (COP), and the like.

The first adhesive layer 120 is disposed on the other surface of the first film layer 110 to bond or adhere the first film layer 110 to one surface of the base substrate 310. That is, the first film layer 110 is attached to one surface of the base substrate 310 by the first adhesive layer 120. The second adhesive layer 220 is disposed on a surface of the second film layer 210 to couple the second film layer 210 with the other surface of the base substrate 310. That is, the second film layer 210 is attached to the other surface of the base substrate 310 by the second adhesive layer 220. The first adhesive layer 120 and the second adhesive layer 220 may not be disposed on the first pull-tab PT1 and the second pull-tab PT2 that do not have to be coupled with the base substrate 310.

The adhesive force or coupling force between the first adhesive layer 120 and the base substrate 310 and between the second adhesive layer 220 and the base substrate 310 is enough so long as the first film layer 110 and the second film layer 210 are not separated off from the base substrate 310 while the window is stored or moved. When the protective films 100 and 200 are peeled off, it is desired that the first adhesive layer 120 and the second adhesive layer 220 are attached to the first film layer 110 and the second film layer 210, respectively, while the protective films 100 and 200 are peeled off from the base substrate 310 such that the first adhesive layer 120 and the second adhesive layer 220 do not remain on the surface of the base substrate 310. To this end, the coupling force between the first adhesive layer 120 and the base substrate 310 and between the second adhesive layer and 220 and the base substrate 310 may be weaker than the coupling force between the first film layer 110 and the first adhesive layer 120 and between the second film layer 210 and the second adhesive layer 220.

The first adhesive layer 120 and the second adhesive layer 220 may be made of a low adhesive layer. For example, the first adhesive layer 120 and the second adhesive layer 220 may include acrylic, urethane, or silicone adhesive materials.

The first masking pattern 130 is disposed on the other surface of the first adhesive layer 120, and the second masking pattern 230 is disposed on the surface of the second adhesive layer 220. The first masking pattern 130 and the second masking pattern 230 cover the adhesive surfaces of the first adhesive layer 120 and the second adhesive layer 220, respectively, to prevent the adhesive material of the first adhesive layer 120 and the second adhesive layer 220 from being in contact with the surface of the window 300 near the masking patterns. When the first protective film 100 and the second protective film 200 are peeled off, some of the adhesive material of the first adhesive layer 120 and the second adhesive layer 220 attached to the surface of the window 300 may remain. In this regard, the surface of the window 300 in contact with the first masking pattern 130 and the second masking pattern 230 is not in contact with the adhesive material, and thus it is possible to prevent the adhesive material from remaining near the masking patterns.

Although the first protective film 100 and the second protective film 200 are partially not coupled with the window 300 near the first and second masking patterns 130 and 230, respectively, they are generally coupled with the window 300 by the first adhesive layer 120 and the second adhesive layer 220 at the remaining areas, thereby protecting both surfaces of the window 300 until they are peeled off.

The first masking pattern 130 and the second masking pattern 230 may be made of a non-adhesive material. Accordingly, the first protective film 100 and the second protective film 200 can have a non-adhesive area NAR near the masking patterns (see FIG. 12). In some implementations, the first masking pattern 130 and the second masking pattern 230 may have a very low level of adhesive force. Even so, it is desired that the adhesive force is weaker than that of the first adhesive layer 120 or the second adhesive layer 220 such that almost no adhesive material remains on the surface of the window 300 at the time of peeling.

In an embodiment, the first and second masking patterns 130 and 230 may be made of UV curable ink, for example. The first and second masking patterns 130 and 230 may further include a pigment or a dye. Various other non-adhesive materials may be used as the material of the first and second masking patterns 130 and 230.

The first and second masking patterns 130 and 230 may be formed directly on the first and second adhesive layers 120 and 220, respectively, by screen printing, inkjet printing, gravure printing, offset printing, or the like.

If the first masking pattern 130 and the second masking pattern 230 occupy too large of an area on the first and second adhesive layers 120 and 220, respectively, the overall coupling force may become weak. As a result, the first protective film 100 or the second protective film 200 may be detached from the window 300 while the window 300 is stored or moved before the peeling process. Accordingly, it is desired that the first masking pattern 130 and the second masking pattern 230 are selectively formed in locations where no adhesion is required. In this regard, an arrangement of the first masking pattern 130 and the second masking pattern 230 according to an exemplary embodiment will be described in further detail below.

Figure 5:
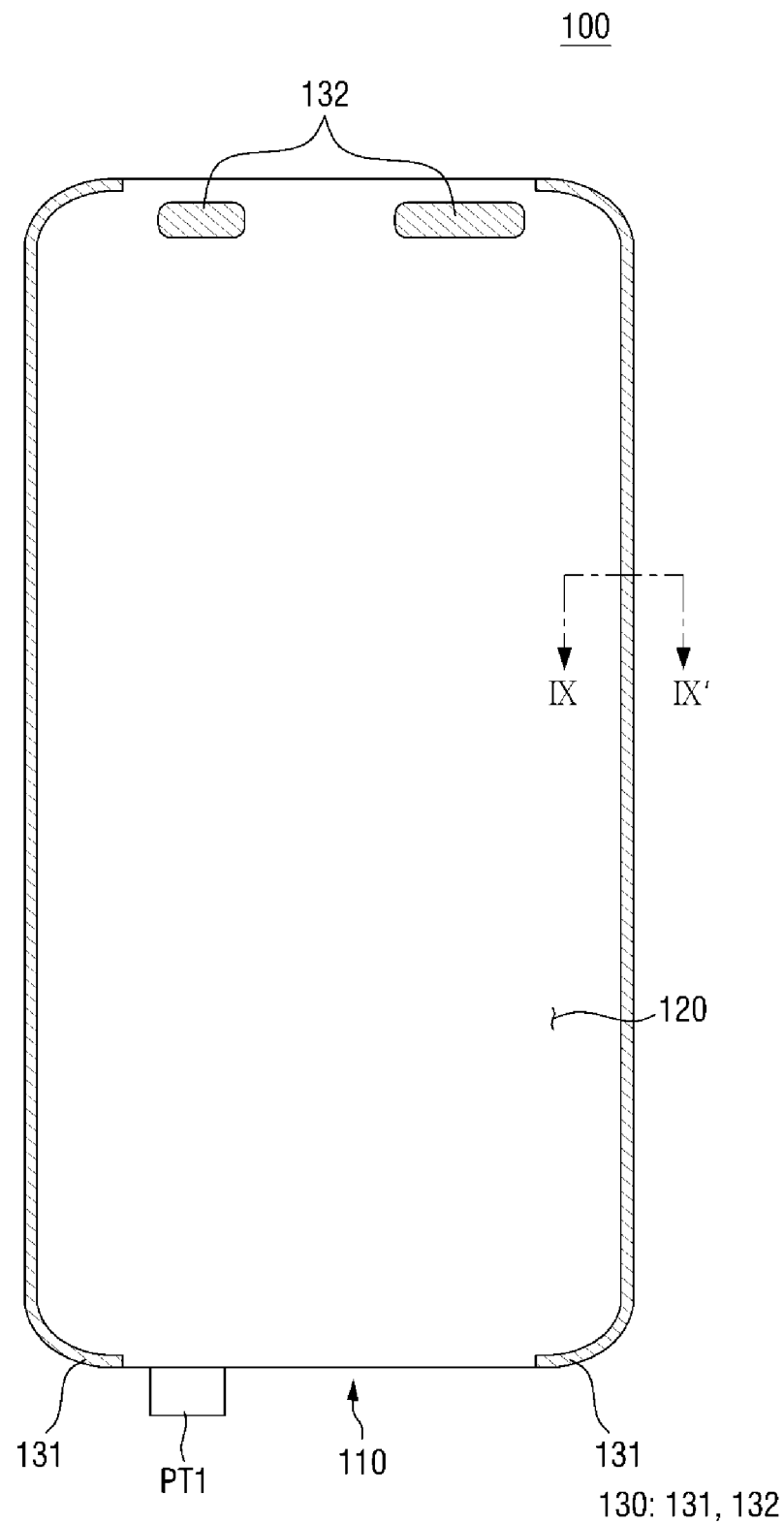
FIG. 5 is a plan view of a first protective film of a window member according to an exemplary embodiment of the present disclosure.
Figure 6:
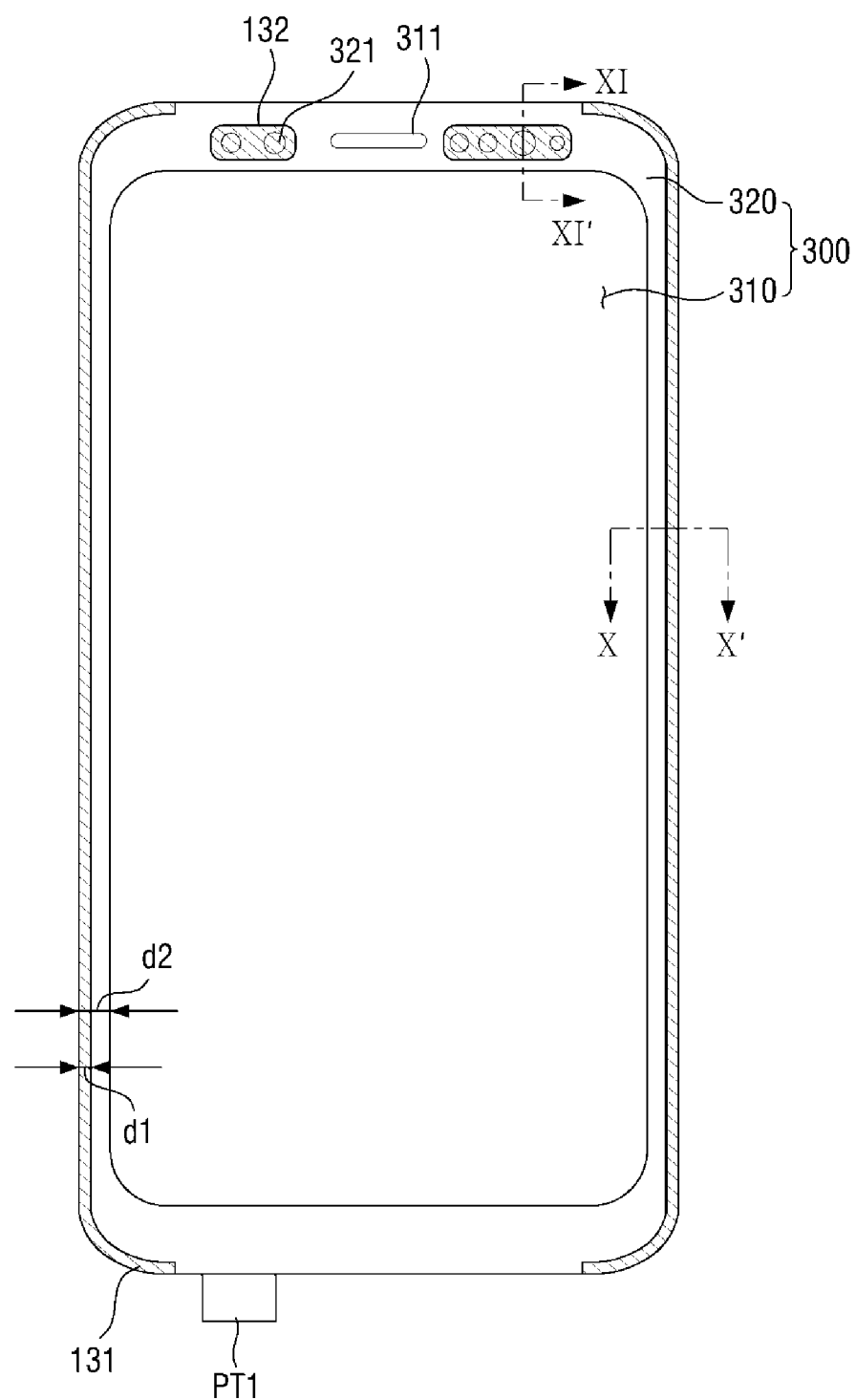
FIG. 6 is a view of the first protective film of FIG. 5 attached to a window.
Figure 7:
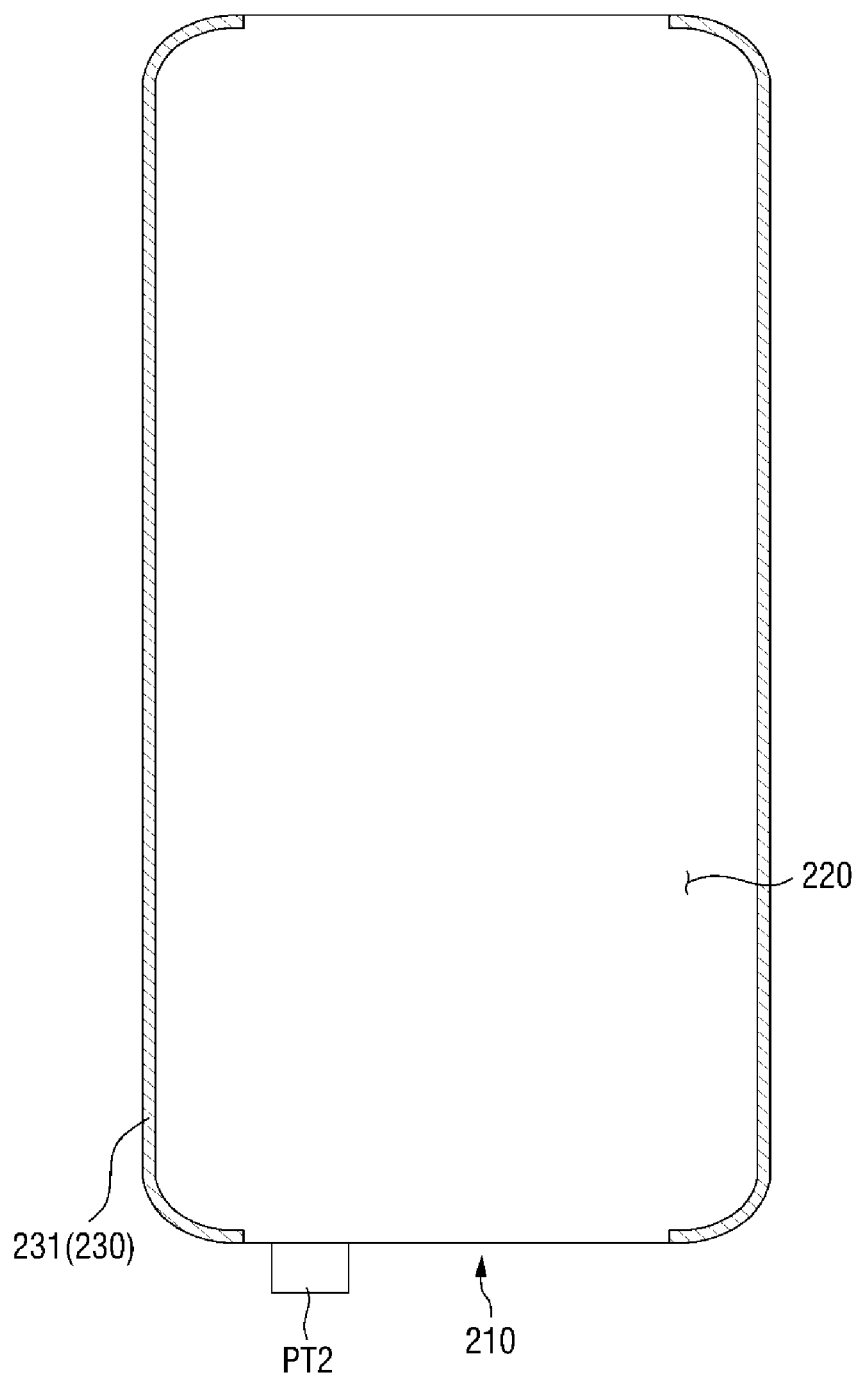
FIG. 7 is a plan view of a second protective film of a window member according to an exemplary embodiment of the present disclosure.
Figure 8:
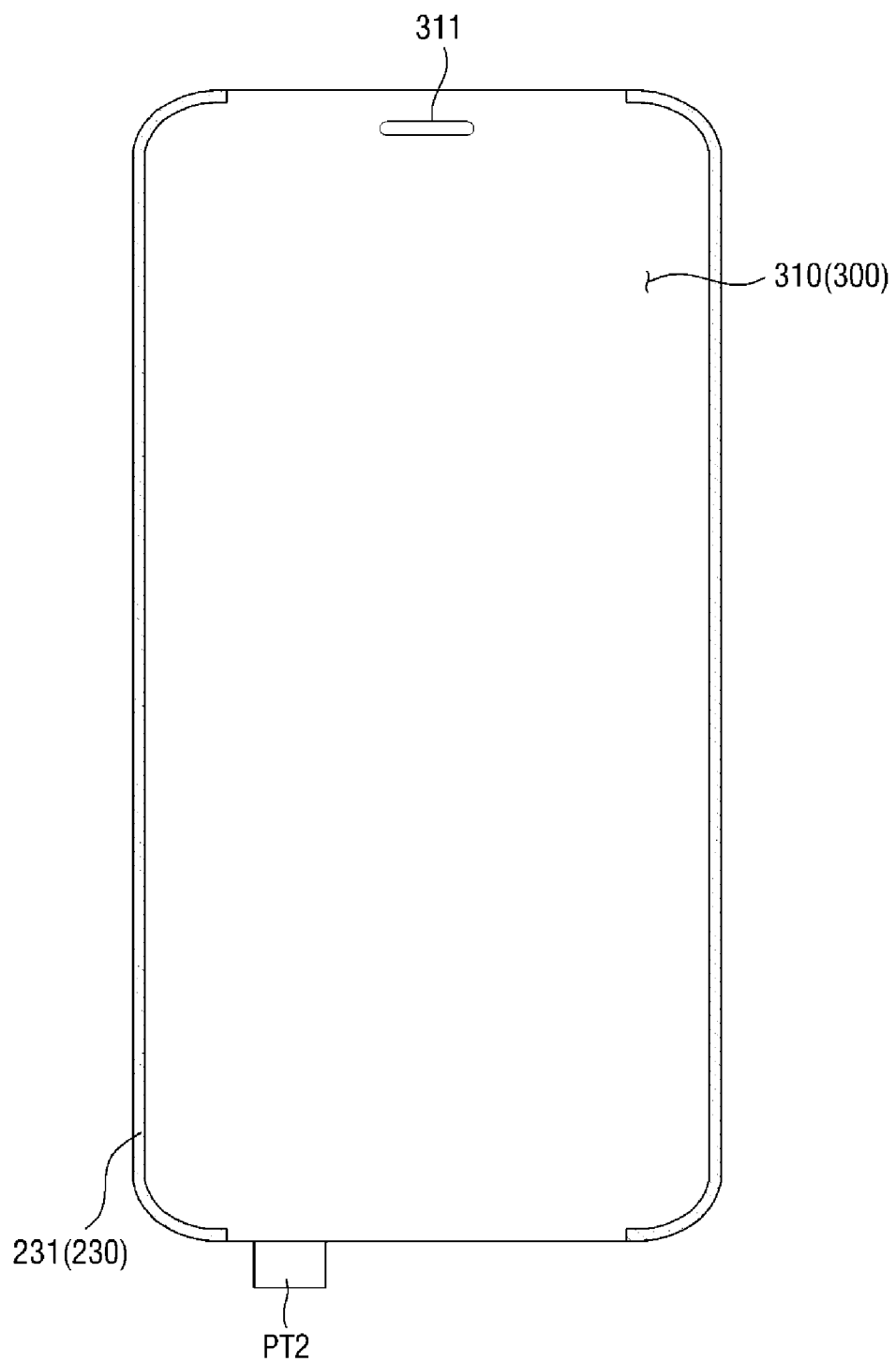
FIG. 8 is a view of the second protective film of FIG. 7 attached to the window.
Figure 9A:
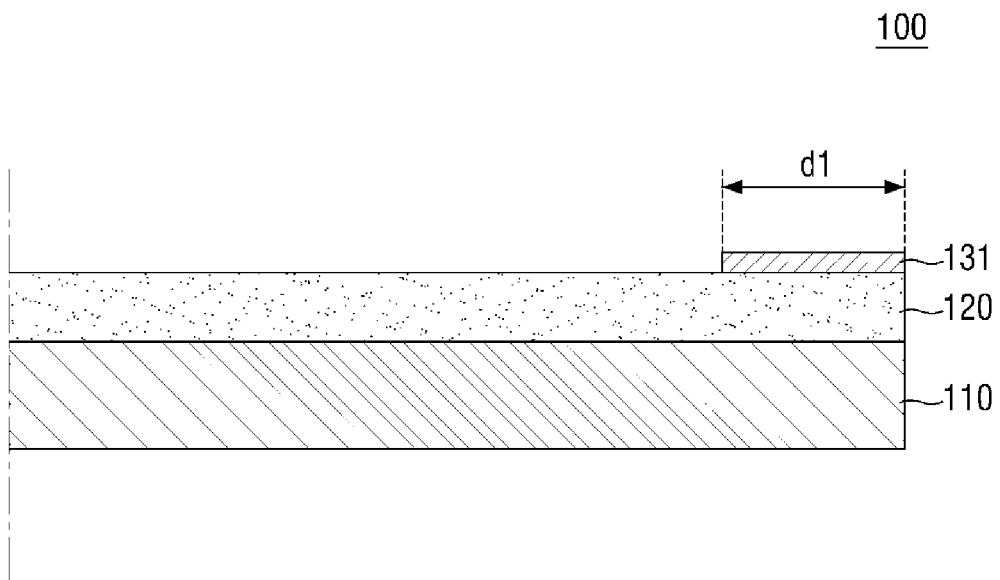
FIG. 9A is a cross-sectional view of the first protective film of FIG. 5, taken along the line IX-IX'.
Figure 9B:
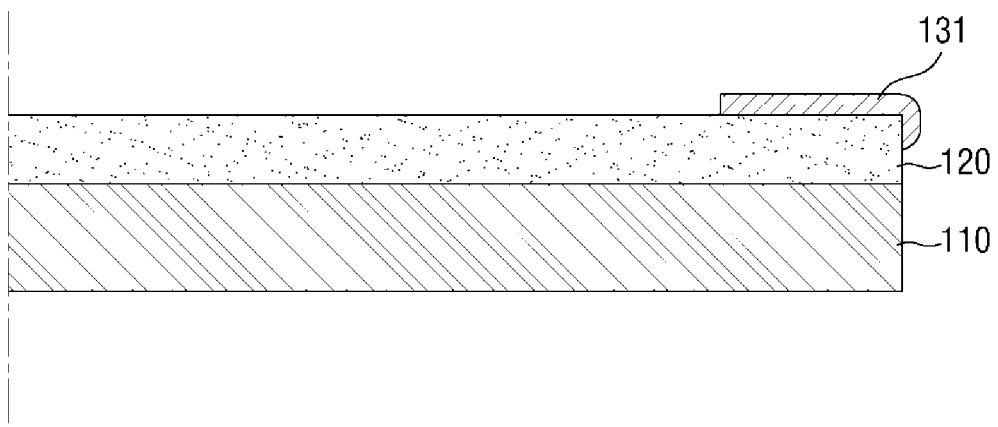
FIGS. 9B and 9C are cross-sectional views showing modifications of the first protective film of FIG. 9A.
Figure 9C:
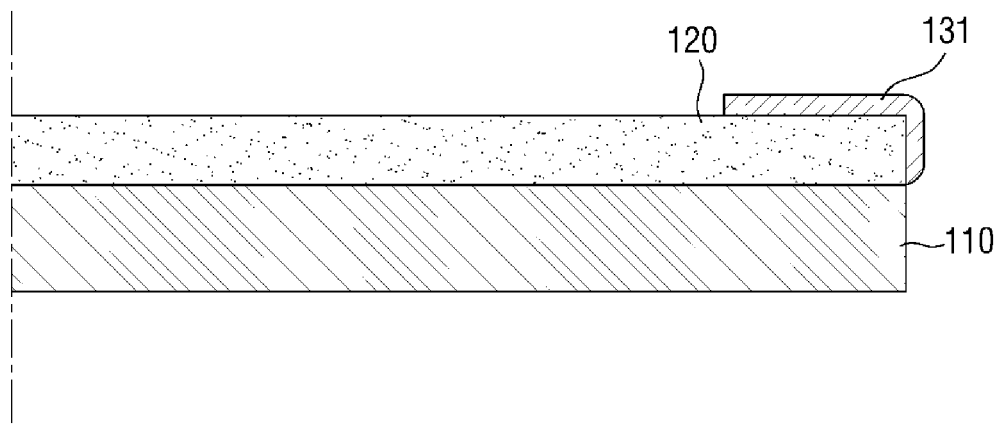
Figure 10:
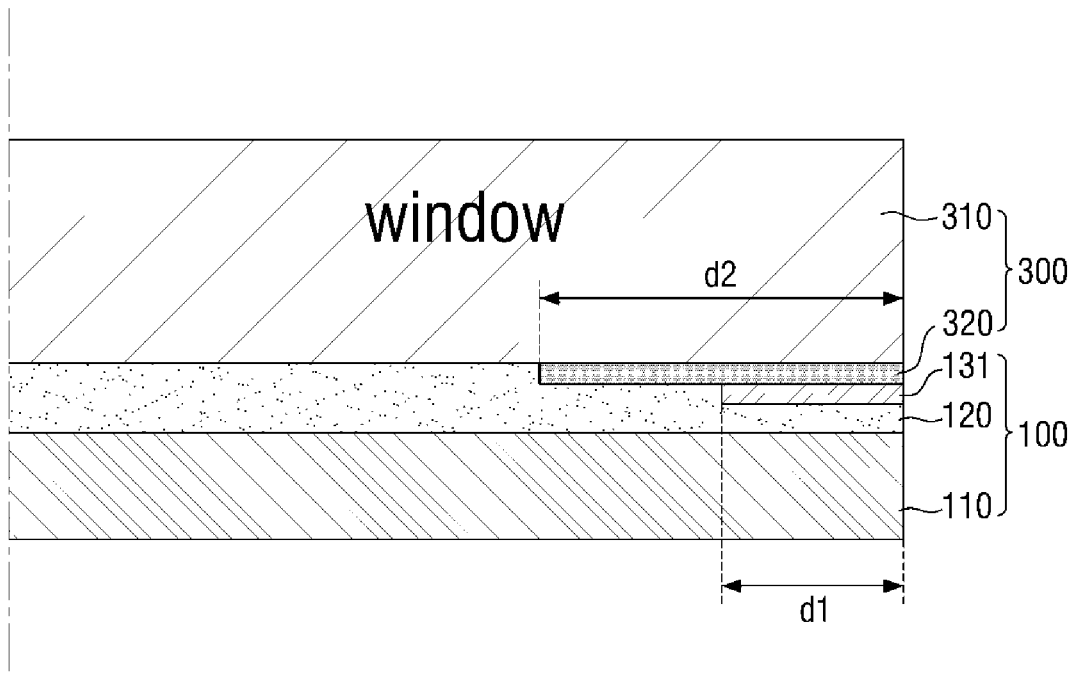
FIG. 10 is a cross-sectional view of the first protective film attached to the window of FIG. 6, taken along the line X-X'.
Figure 11:
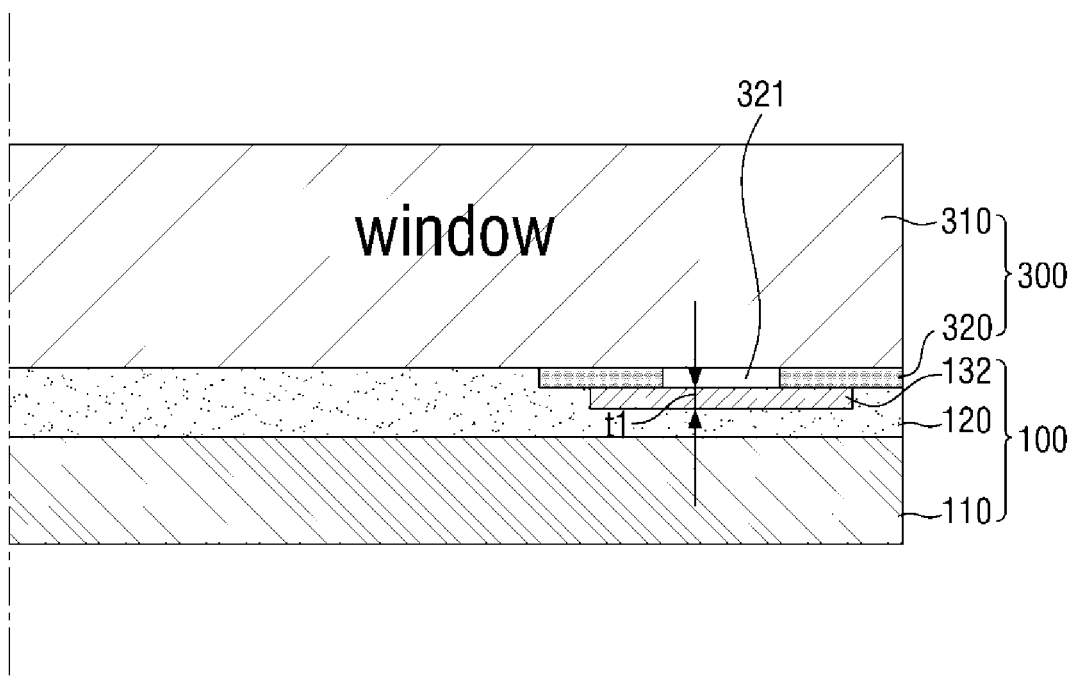
FIG. 11 is a cross-sectional view of the first protective film attached to the window of FIG. 6, taken along the line XI-XI'.
Figure 12:
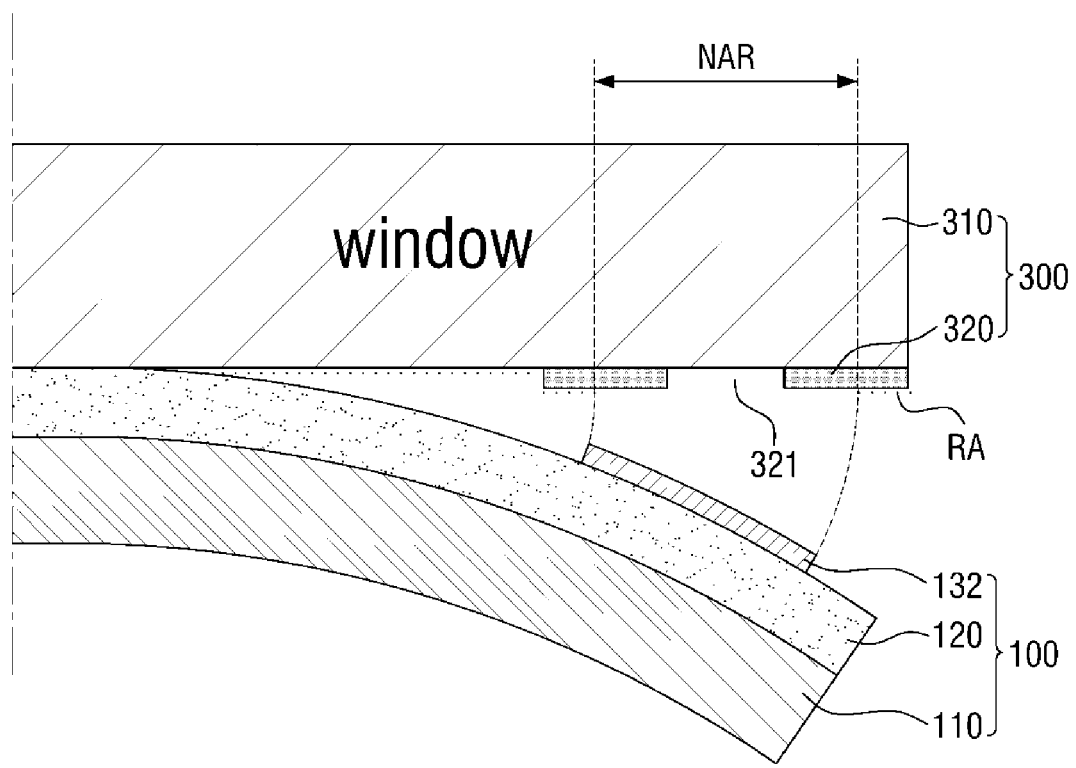
FIG. 12 is a cross-sectional view showing a process of peeling off the first protective film from the window shown in FIG. 11.

FIG. 5 is a plan view of the first protective film 100. FIG. 6 is a view of the first protective film 100 attached to the window 300. FIG. 7 is a plan view of the second protective film 200. FIG. 8 is a view of the second protective film 200 attached to the window 300. FIG. 9A is a cross-sectional view of the first protective film 100, taken along the line IX-IX' of FIG. 5. FIGS. 9B and 9C are cross-sectional views showing modifications of a first protective film. FIG. 10 is a cross-sectional view of the first protective film 100 attached to the window 300, taken along the line X-X' of FIG. 6. FIG. 11 is a cross-sectional view of the first protective film 100 attached to the window 300, taken along the line XI-XI' of FIG. 6. FIG. 12 is a cross-sectional view showing a process of peeling off the first protective film 100 from the window 300 shown in FIG. 11.

Referring to FIGS. 5 to 8, the first masking pattern 130 includes a first edge masking pattern 131, and the second masking pattern 230 includes a second edge masking pattern 231.

The first edge masking pattern 131 will be described firstly. The first masking pattern 130 is located at the edge of the first protective film 100. The first masking pattern 130 may be extended along the edge of at least one side of the first adhesive layer 120. The first edge masking pattern 131 may cover the outer edge of the first adhesive layer 120. For example, as shown in FIG. 9A, the outer side surface of the first edge masking pattern 131 may be substantially aligned with the side surface of the first adhesive layer 120. As another example, the first edge masking pattern 131 may be further extended outwardly to partially cover the side surface of the first adhesive layer 120, as shown in FIG. 9B, or to completely cover the side surface of the first adhesive layer 120, as shown in FIG. 9C. That is, the outer side surface of the first edge masking pattern 131 may be aligned with the side surface of the first adhesive layer 120 or may be located more to the outside than the first adhesive layer 120.

When the adhesive material reaches the edge of the window 300, the adhesive material may leak to the outside and contaminate the side surface of the window 300. For example, the adhesive material is likely to flow to the outside as the window member 500 is pressed, a number of window members 500 are stacked on one another, a high-temperature treatment is carried out, and so on. If the adhesive material reaches the side surface of the window 300, the adhesive material itself may contaminate it. Further, foreign matter may adhere to the side surface of the window 300, worsening contamination. If the contaminants on the side surface of the window 300 are introduced when the window 300 is attached to the display panel 20 (see FIG. 2), it may cause defects in the image quality.

According to exemplary embodiments of the present disclosure, the first edge masking pattern 131 covers the outer edge of the first adhesive layer 120, and, thus, the adhesive material does not reach the edge of the window 300 even if the first protective film 100 is attached to the window 300, as shown in FIG. 10. Accordingly, it is possible to block the adhesive material from flowing down to the side surface of the window 300, thereby preventing or substantially preventing contamination on the side surface of the window 300.

In addition, since the part of the first protective film 100 where the first edge masking pattern 131 is formed is not coupled with the window 300, the process of peeling off the first protective film 100 may be performed from there.

Although not shown in the drawings, when the outer side surface of the first edge masking pattern 131 is located more to the inside than the side surface of the first adhesive layer 120 such that a part of the edge of the first adhesive layer 120 is exposed, the exposed part is very small. Accordingly, the edge of the first adhesive layer 120 does not reach the window 300, or a very small amount of the adhesive material may reach the window 300. Also, in this case, it is possible to prevent or reduce the contamination on the side surface of the window 300 as described above.

In an exemplary embodiment, the first edge masking pattern 131 may overlap with the printed pattern 320 of the window 300 in the window member 500. A width d1 of the first edge masking pattern 131 may be smaller than a width d2 of the printed pattern 320 of the window 300 (see FIG. 6) such that the inner side surface of the first edge masking pattern 131 may be disposed on the printed pattern 320 of the window 300. Then, the entire surface of the first edge masking pattern 131 may be in contact with the printed pattern 320 of the window 300. It is, however, to be noted that this is merely illustrative. For example, the printed pattern 320 of the window 300 may be omitted, or the width d2 of the printed pattern 320 may be smaller than the width d1 of the first edge masking pattern 131. In this case, some or the entire surface of the first edge masking pattern 131 may be in contact with the base substrate 310 of the window 300.

In an embodiment, the width d1 of the first edge masking pattern 131 may be in a range from 0.5 to 1.5 mm. The non-adhesive area at the edge of the window 300 can prevent the adjacent material from overflowing to the side surface of the window 300 when the width d1 of the first edge masking pattern 131 is 0.5 mm or more. When the width d1 of the first edge masking pattern 131 is 1.5 mm or less, it is possible to prevent that the first protective film 100 is peeled off from the edge or the coupling between the first protective film 100 and the window 300 becomes weak, such that the first protective film 100 may be detached during the peeling process.

In an embodiment, the first edge masking pattern 131 may be extended along the entire edge of the longer sides of the first adhesive layer 120 such that the longer sides of the window 300 can be protected from the overflowing adhesive material to prevent or substantially prevent the side surface from being contaminated by foreign matter. In an exemplary embodiment, the first edge masking pattern 131 may be extended along the edge of the longer sides on the first adhesive layer 120 and extended up to the edges of the upper and lower shorter sides beyond the corners. In an embodiment, the first edge masking pattern 131 located on the two longer sides may be disconnected at the shorter sides, where the side surfaces are less frequently contaminated. At the edges of the upper and lower shorter sides where the first second masking pattern 131 is disconnected, the first adhesive layer 120 can be attached to the surface of the window 300, such that the coupling force between the first protective film 100 and the window 300 can be increased.

The second edge masking pattern 231 is located at the edge of the second protective film 200. In an embodiment, the second edge masking pattern 231 and the first edge masking pattern 131 may have the same shape and may be disposed so that they completely overlap with each other. It is, however, to be understood that this is merely illustrative. The shape and arrangement of the second edge masking pattern 231 and the first edge masking pattern 131 may vary in other implementations. Since the second edge masking pattern 231 is in contact with the second surface of the window 300 other than the surface on which the printed pattern 320 is formed, it is not in contact with the printed pattern 320 of the window 300, unlike the first edge masking pattern 131. In an embodiment, the function, position, width, and the like of the second edge masking pattern 231 are substantially identical to those of the first edge masking pattern 131 except that the former does not come in contact with the printed pattern 320; and, therefore, a redundant description thereof will be omitted.

The first masking pattern 130 may further include an opening masking pattern 132. The opening masking pattern 132 covers the opening 321 formed in the printed pattern 320. In an embodiment, the opening masking pattern 132 may be formed together with the first edge masking pattern 131 via the same process and accordingly may have a same thickness as the first edge masking pattern 131. In an exemplary embodiment, a single opening masking pattern 132 may cover a number of openings 321 in the printed pattern 320 which are adjacent to one another. The opening masking pattern 132 may have a size large enough to completely cover the openings 321.

The opening masking pattern 132 may eliminate the possibility that a residual adhesive material RA remains in the openings 321 in the printed pattern 320. The base substrate 310 of the window 300 exposed via the openings 321 is not in direct contact with the first adhesive layer 120 by the opening masking pattern 132, as shown in FIG. 11. Accordingly, as shown in FIG. 12, when the first protective film 100 is peeled off from the window 300, the residual adhesive material RA may be on a part of the surface of the window 300 where no opening masking pattern 132 is disposed, whereas no residual adhesive material RA will remain in the openings 321 of the printed pattern 320 covered with the opening masking pattern 132. Therefore, it is possible to prevent or substantially prevent the openings 321 from being contaminated by foreign matter, thereby preventing or substantially preventing a camera or a sensor disposed over the openings 321 from working improperly due to the foreign matter.

On the other hand, the second protective film 200 may not include an opening masking pattern, as shown in FIG. 7. The second protective film 200 is attached to the second surface of the base substrate 310, where neither the printed pattern 320 is formed nor the display panel is attached. Accordingly, the second protective film 200 can be cleaned more freely. Accordingly, even if some of the adhesive material remains on the second surface of the base substrate 310 after peeling since there is no opening masking pattern 132 over the openings 321, it is easy to remove it by a cleaning process. Therefore, no additional opening masking pattern is required. It is, however, to be understood that the second making pattern 230 of the second protective film 200 may further include an opening masking pattern over the openings 321 of the printed pattern 320 of the window 300.

As described above, the thickness of the first edge masking pattern 131 of the first masking pattern 130 may be equal to the thickness of the opening masking pattern 132. Further, the thicknesses of the first masking pattern 130 may be substantially equal to the thickness of the second masking pattern 230.

The thicknesses of the first and second masking patterns 130 and 230 will be described with an example of a thickness t1 of the opening masking pattern 132 shown in FIG. 11. The thickness t1 of the first and second masking patterns 130 and 230 may be equal to or greater than approximately 0.1 µm. If the thickness t1 of the first and second masking patterns 130 and 230 is less than 0.1 µm, a process stability and pattern reliability may be deteriorated. Therefore, the thickness t1 of the first and second masking patterns 130 and 230, according to an exemplary embodiment, is equal to or greater than approximately 0.1 µm.

On the other hand, if the thickness t1 of the first and second masking patterns 130 and 230 is too large, the first protective film 100 or the second protective film 200 may be peeled off. A more detailed description thereof will be described with reference to FIG. 13.

Figure 13:
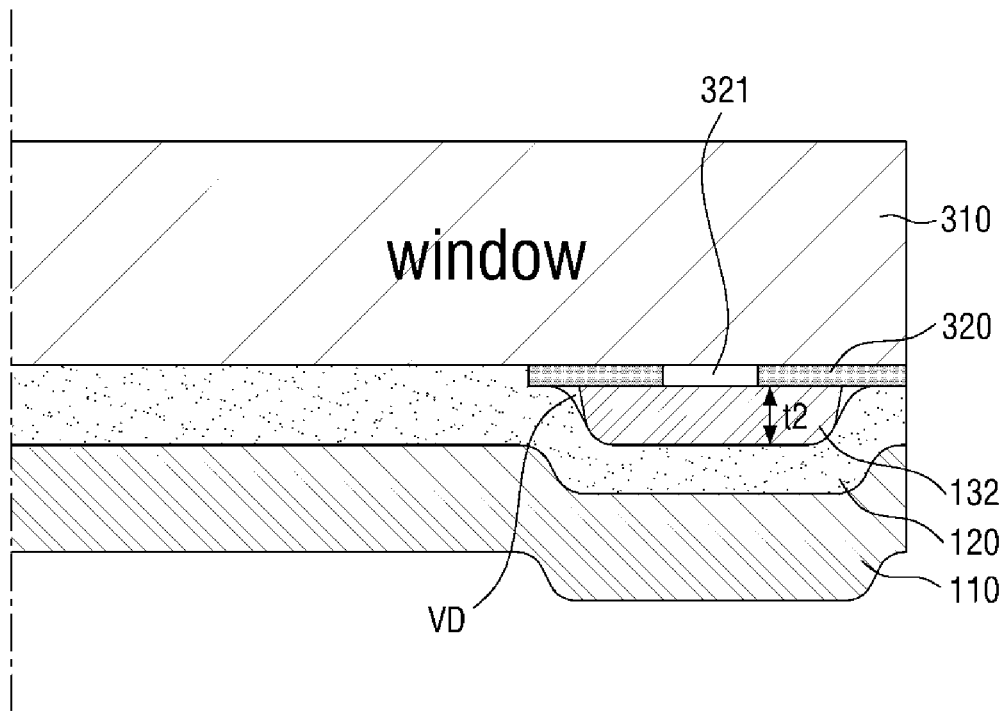
FIG. 13 is a cross-sectional view illustrating a first film layer separated from a window when a thickness of a masking pattern is large.

FIG. 13 is a cross-sectional view illustrating a first film layer separated from a window when a thickness of a masking pattern is large. A thickness t2 of the opening masking pattern 132 in FIG. 13 is much larger than the thickness t1 of the opening masking pattern 132 in FIG. 11. In FIG. 13, the thickness t2 of the opening masking pattern 132 is too large, such that the first adhesive layer 120 and the first film layer 110 overlapping the opening mask pattern 132 are raised in the thickness direction. As a result, the first adhesive layer 120 may fail to be coupled with the surface of the window 300 around the opening masking pattern 132, such that a void VD may be formed. If the void VD becomes too large, the first protective film 100 may be generally detached from the window 300 to be detached before the process of peeling. In addition, as the first adhesive layer 120 and the first film layer 110 are raised in the thickness direction, while a number of window members 500 stacked on one another are stored or moved, the window members 500 may be dropped due to the level difference on the surface. When a film-type masking pattern is attached, it has a thickness of approximately 50 µm or more. Such a thickness may cause the detaching as described above.

As shown in FIG. 12, in order to suppress the detaching, according to an exemplary embodiment, the thickness t1 of the first and second masking patterns 130 and 230 is approximately 10 µm or less. In view of the above, the thickness t1 of the first and second masking patterns 130 and 230 may be in a range of 0.1 µm to 10 µm. In an exemplary embodiment, the thickness t1 of the first and second masking patterns 130 and 230 may be in a range from 1 µm to 4 µm.

Herein, other exemplary embodiments will be described.

Figure 14:
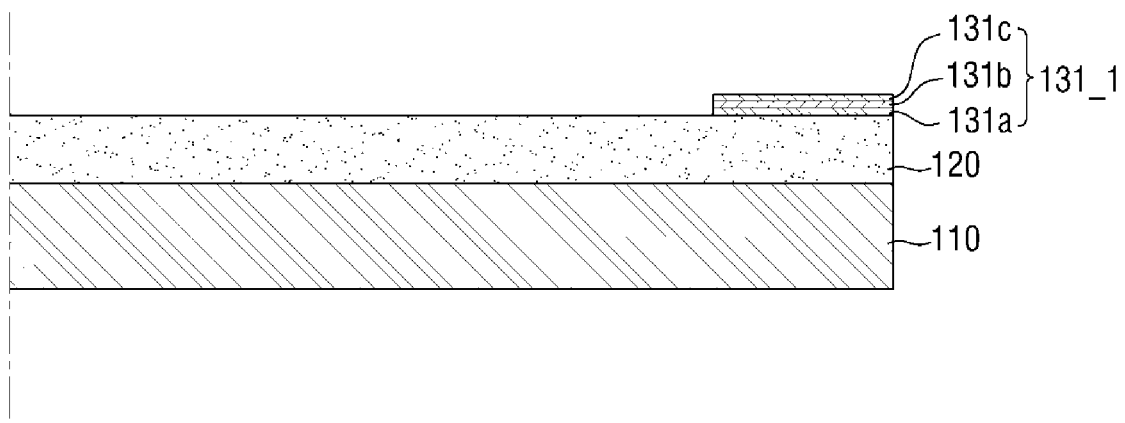
FIG. 14 is a cross-sectional view of a first protective film according to another exemplary embodiment.

FIG. 14 is a cross-sectional view of a first protective film according to another exemplary embodiment.

A first protective film 101 according to another exemplary embodiment shown in FIG. 14 is the same as that shown in FIG. 9A except that a first edge masking pattern 131_1 includes a plurality of layers.

The first edge masking pattern 131_1 may include a first layer 131a, a second layer 131b, and a third layer 131c. For example, by performing three-tone printing, the first edge masking pattern 131_1 formed of the three layers 131a, 131b, and 131c as shown in FIG. 14 can be formed. Although the first edge masking pattern 131_1 includes three layers, in an exemplary embodiment, an overall thickness of the first edge masking pattern 131_1 is within the range of the above-described thickness t1 of the masking patterns.

The first layer 131a, the second layer 131b, and the third layer 131c may or may not have the same width. Although the stack of three layers is shown in the example of FIG. 14, two layers or four or more layers may be stacked. Although not shown in the drawings, it is to be understood that when the first edge masking pattern 131_1 includes three layers, the opening masking pattern may also include three layers.

Figure 15:
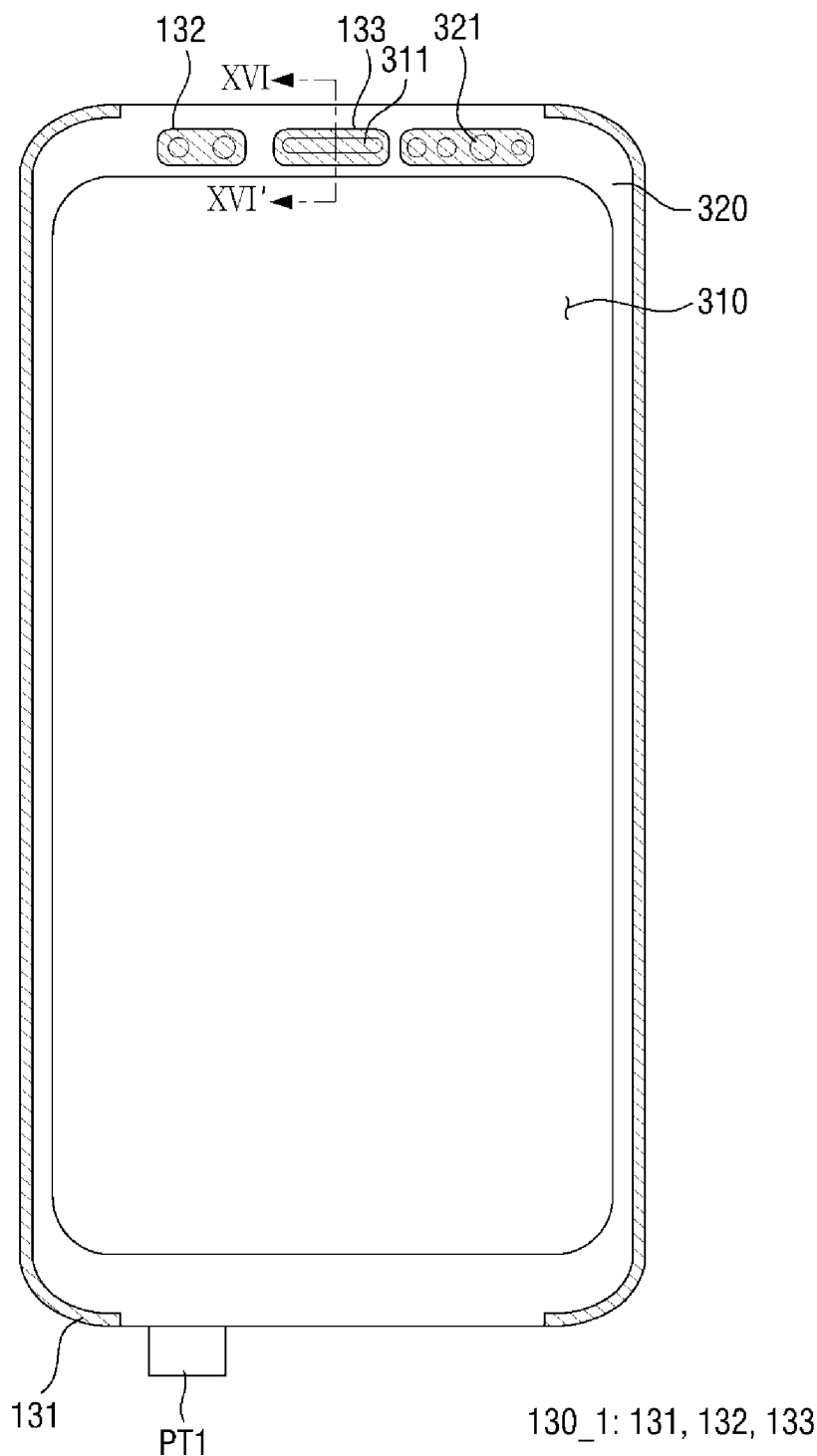
FIG. 15 is a view showing a first protective film attached to a window according to another exemplary embodiment.

FIG. 15 is a view showing a first protective film attached to a window according to another exemplary embodiment; and FIG. 16 is a cross-sectional view taken along the line XVI-XVI' of FIG. 15.

A first masking pattern 130_1 of a first protective film according to another exemplary embodiment shown in FIGS. 15 and 16 is the same as that shown in FIG. 6 except that the former further includes a window hole masking pattern 133 covering the window hole 311.

The window hole masking pattern 133 covers the window hole 311 to prevent the adhesive material of the first adhesive layer 120 from flowing to the inner wall of the window hole 311. By doing so, it is possible to prevent or substantially prevent contamination on the inner wall of the window hole 311.

Figure 17:
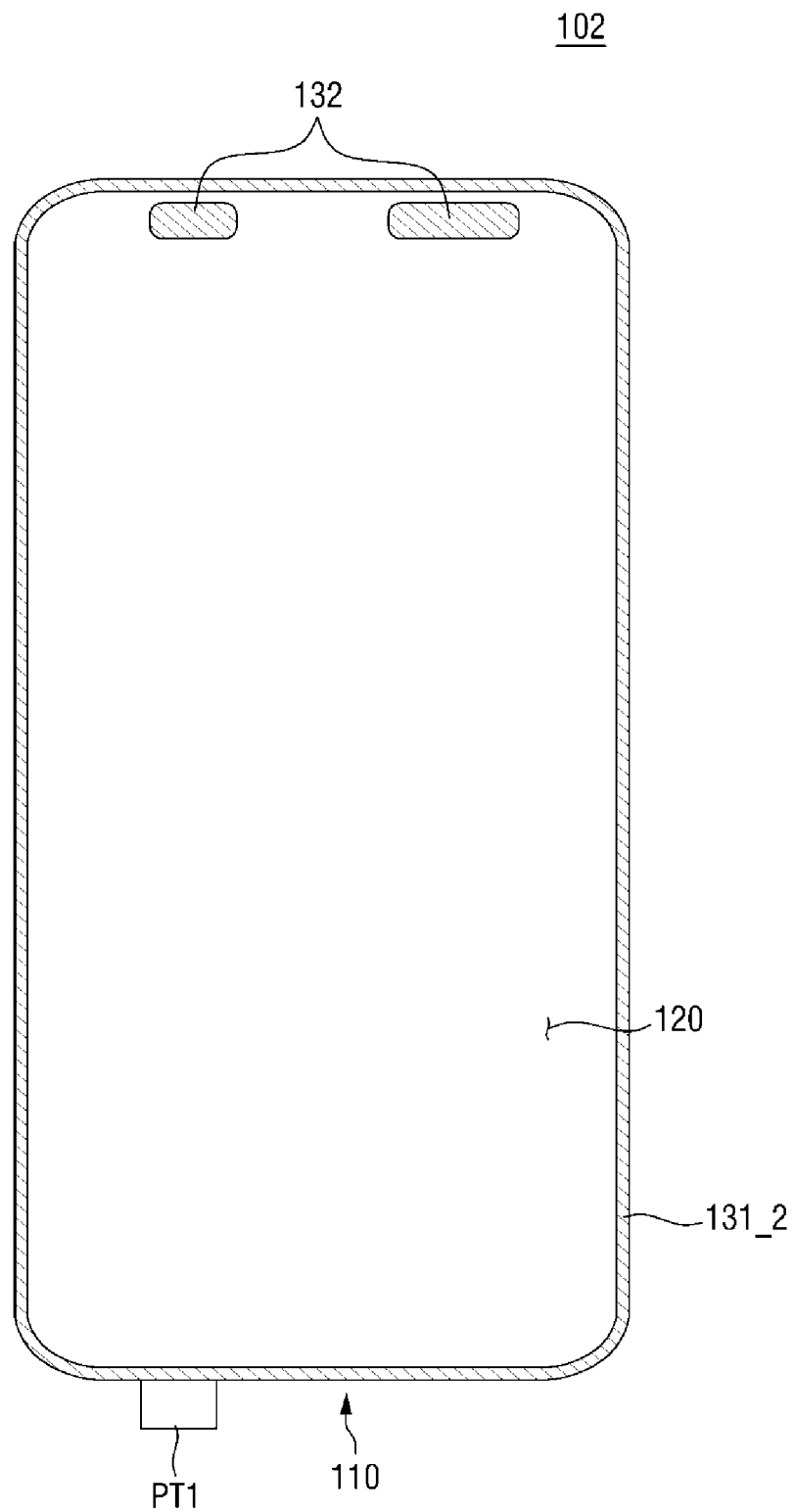
FIG. 17 is a plan view of a first protective film according to another exemplary embodiment.

FIG. 17 is a plan view of a first protective film according to another exemplary embodiment.

A first protective film 102 according to another exemplary embodiment shown in FIG. 17 is the same as that shown in FIG. 5 in that a first edge masking pattern 131_2 of the first protective film 102 is extended along the two longer sides and extended to the upper and lower shorter sides beyond the corners, but is different in that the first protective film 102 is further extended also along the upper and lower shorter sides to form a single piece of the first edge masking pattern 131_2. As such, the first edge masking pattern 131_2 masks the two shorter sides in addition to the two longer sides, such that a possibility that the side surface of the window being contaminated by the foreign matter at all of the edges may be eliminated.

Figure 18:
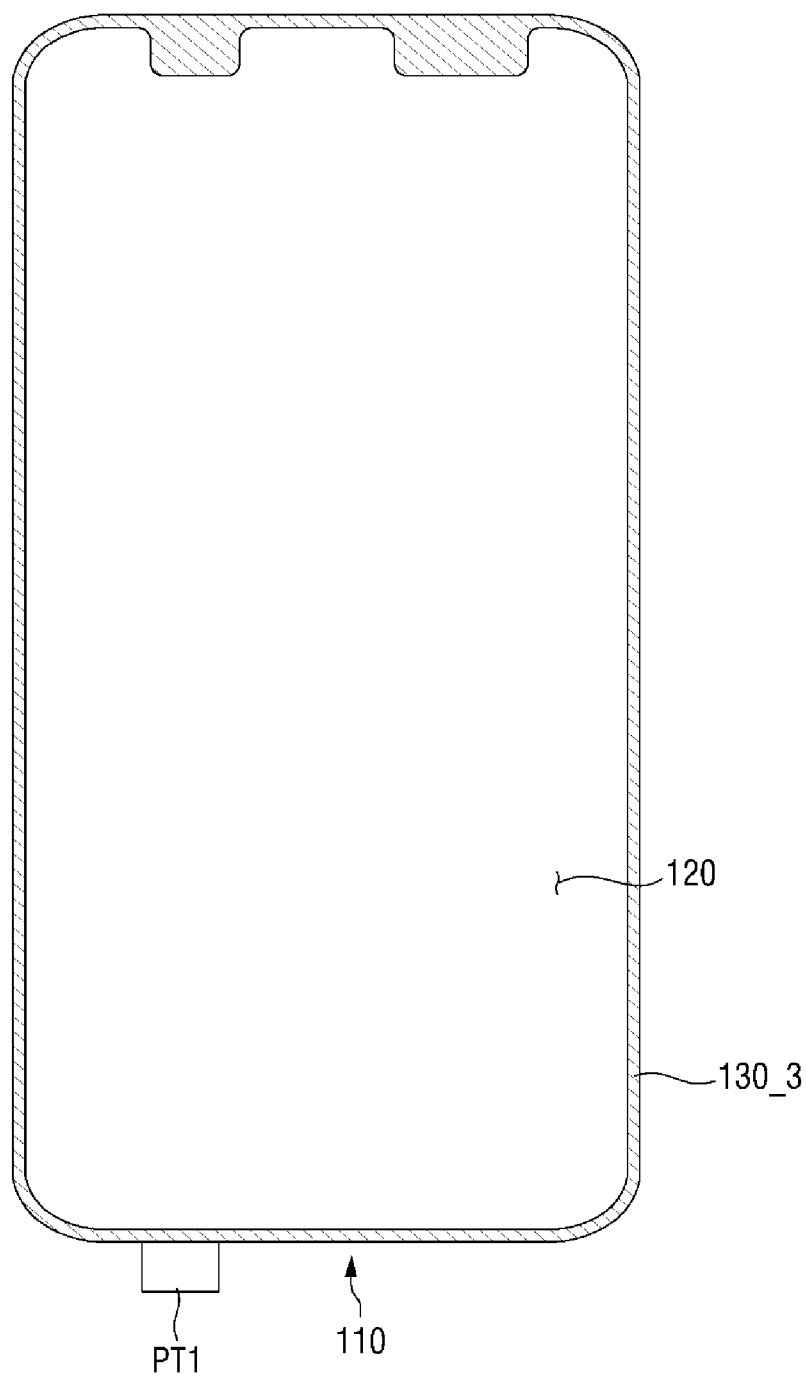
FIG. 18 is a plan view of a first protective film according to another exemplary embodiment.

FIG. 18 is a plan view of a first protective film according to another exemplary embodiment.

A first protective film 103 according to another exemplary embodiment shown in FIG. 18 is different from that shown in FIG. 17 in that a first masking pattern 130_3 includes a first edge masking pattern and an opening masking pattern connected to each other integrally. That is, a space between the edge of the upper shorter side of the first edge masking pattern and the opening masking pattern is filled with the masking pattern, such that they are connected to each other. As a result, a non-adhesive area having a considerably large width is formed at the upper shorter side of the window member, and the non-adhesive area may be advantageously utilized as a pull-tab.

A coupling force between the first protective films 102 and 103 and the window may be somewhat compromised because the area of the masking becomes larger in the exemplary embodiments shown in FIGS. 17 and 18. Accordingly, the exemplary embodiments may be applied when defects by foreign matter are more serious relative to an importance of the coupling force.

Figure 19:
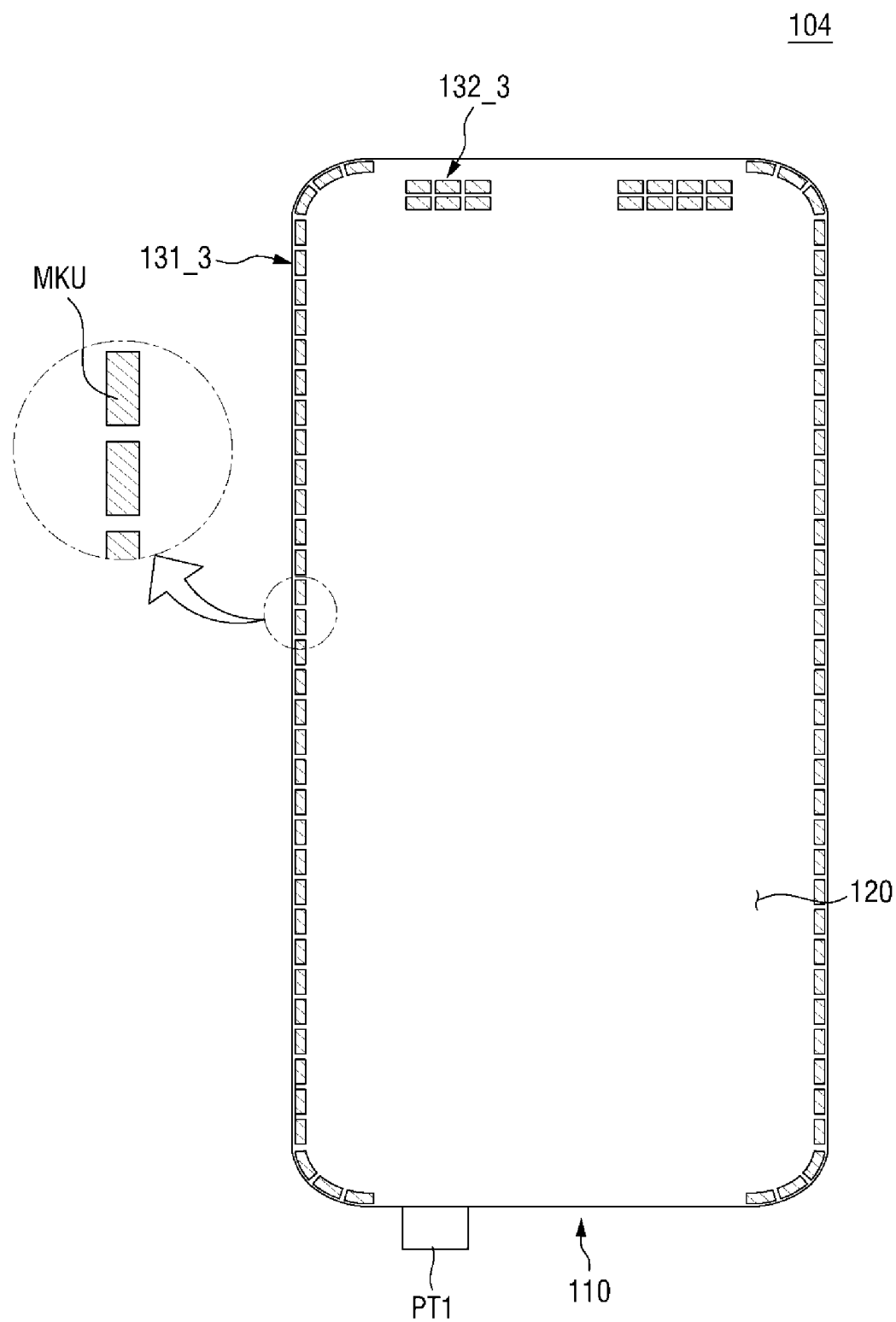
FIG. 19 is a plan view of a first protective film according to another exemplary embodiment.

FIG. 19 is a plan view of a first protective film according to another exemplary embodiment.

A first protective film 104 according to another exemplary embodiment shown in FIG. 19 is different from that shown in FIG. 5 in that a first edge masking pattern 131_3 and an opening masking pattern 132_3 each includes a plurality of masking pattern units MKU separated from one another.

A masking pattern unit MKU is spaced apart from an adjacent masking pattern unit MKU. The surface of the first adhesive layer 120 may be exposed via the space therebetween. If the space between the masking pattern units MKU is large, the effect of masking is reduced. Accordingly, by narrowing the space, the effect of the masking can be maintained substantially. That is, the exposed surface of the first adhesive layer 120 may be detached from the surface of the window or may have a weak coupling force. Thus, it is possible to block or reduce residual adhesive material.

The masking pattern units MKU may be arranged in one column or in a plurality of columns. Although the masking pattern units MKU are shown having a rectangular shape in FIG. 19, it is to be understood that the masking pattern units MKU may be modified to have any of a variety of shapes.

Herein, an exemplary method for fabricating a display device using a window member including the above-described protective film will be described.

Figure 20:
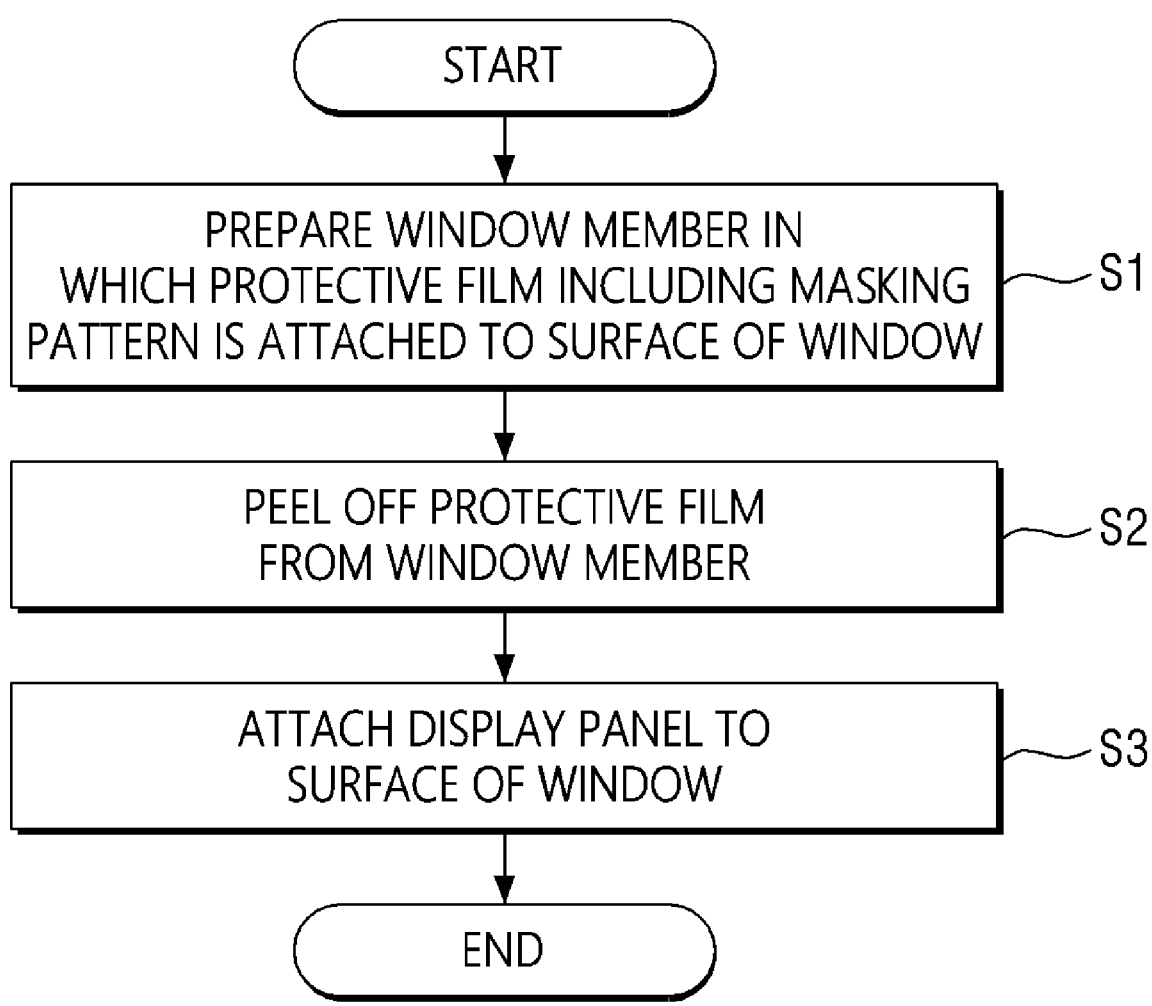
FIG. 20 is a flowchart for illustrating a method for fabricating a display device according to an exemplary embodiment of the present disclosure.

FIG. 20 is a flowchart for illustrating a method for fabricating a display device according to an exemplary embodiment of the present disclosure.

Referring to FIG. 20, initially, a window member is prepared, in which a protective film including a masking pattern is attached to a surface of a window (S1).

The preparing the window member may include preparing the protective film including the masking pattern, and attaching the protective film to a surface of the window. As described above, it is to be understood that the first protective film and the second protective film may be provided as the protective films and may be attached to both sides of the window.

The first protective film and the second protective film may be produced by preparing a film in which an adhesive layer is formed on the entire surface of each of the film layers, and then curing a UV curable ink on the adhesive layer by screen printing, inkjet printing, gravure printing, offset printing, or the like, to form a masking pattern.

Subsequently, the protective films are peeled off from the window member (S2). By peeling off the first protective film and the second protective film, the surface of the window is exposed. Even if some of the adhesive material may remain on the surface of the window, the adhesive material does not remain at the position where the masking pattern is formed.

Subsequently, a display panel is attached on a surface of the window (S3). The display panel may be an organic light-emitting display panel, a liquid-crystal display panel, or the like. The display panel may be attached on the surface of the window by a light-transmissive adhesive, a resin, or the like. Another panel, such as a touch panel or an optical film, such as a polarizing film, may be interposed between the display panel and the window. Various structures and fabricating methods related thereto are well known in the art and, thus, are not described in detail.

Aspects and effects of embodiments are not limited to those described herein, and various other effects will be apparent or may be learned from the present disclosure.

While the inventive concept has been particularly illustrated and described with reference to some exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation.

What is claimed is:

1. A window member comprising:
 a window comprising
  a base substrate, and
  a printed pattern along a periphery of a surface of the base substrate; and
 a first protective film on the surface of the base substrate and comprising
  a first film layer,
  a first adhesive layer on the first film layer, and
  a first edge masking pattern on the first adhesive layer along an edge of the first adhesive layer, the first edge masking pattern being located between the first adhesive layer and the window.

2. The window member of claim 1, wherein the first adhesive layer has a rectangular shape with longer sides and shorter sides, and wherein the first edge masking pattern is extended along an edge of at least one of the longer sides of the first adhesive layer.

3. The window member of claim 2, wherein the first edge masking pattern is extended to edges of the shorter sides of the first adhesive layer.

4. The window member of claim 3, wherein an outer side surface of the first edge masking pattern is aligned with a side surface of the first adhesive layer or is located more to an outside than the side surface of the first adhesive layer.

5. The window member of claim 4, wherein a thickness of the first edge masking pattern is 0.1 to 10 μm.

6. The window member of claim 5, wherein a width of the first edge masking pattern is 0.5 to 1.5 mm.

7. The window member of claim 1, wherein the first adhesive layer exposed by the first edge masking pattern is coupled with the surface of the window, and the first edge masking pattern is not coupled with the surface of the window.

8. The window member of claim 1, wherein the printed pattern comprises an opening, and wherein the first protective film further comprises an opening masking pattern arranged on the first adhesive layer to cover the opening of the printed pattern.

9. The window member of claim 1, wherein the window further comprises a window hole that penetrates the base substrate and the printed pattern, and wherein the first protective film further comprises a window hole masking pattern arranged on the first adhesive layer to cover the window hole.

10. The window member of claim 1, further comprising:
 a second protective film on another surface of the window, wherein the second protective film comprises
  a second film layer,
  a second adhesive layer on the second film layer, and
  a second edge masking pattern on the second adhesive layer along an edge of the second adhesive layer.

11. A window member comprising:
a window comprising
a base substrate, and
a printed pattern along a periphery of a surface of the base substrate; and
a first protective film on the surface of the base substrate and comprising
a first film layer,
a first adhesive layer on the first film layer, and
a first edge masking pattern on the first adhesive layer along an edge of the first adhesive layer,
wherein the first edge masking pattern comprises a UV curable ink.

12. The window member of claim 11, wherein the first edge masking pattern is printed directly on the first adhesive layer.

13. A window member comprising:
a window; and
a first protective film on a surface of the window and comprising
a first film layer,
a first adhesive layer on the first film layer, and
a first masking pattern on the first adhesive layer and having a thickness of 0.1 to 10 μm, the first masking pattern being located between the first adhesive layer and the window.

14. The window member of claim 13, wherein the window comprises a base substrate, and a printed pattern along a periphery of a surface of the base substrate, and wherein the first masking pattern comprises an opening masking pattern covering an opening in the printed pattern.

15. The window member of claim 14, wherein the first masking pattern further comprises an edge masking pattern along an edge of the first adhesive layer.

16. The window member of claim 15, further comprising:
a second protective film on another surface of the window,
wherein the second protective film comprises
a second film layer,
a second adhesive layer on the second film layer, and
a second masking pattern on the second adhesive layer along an edge of the second adhesive layer.

17. A window member comprising:
a window; and
a first protective film on a surface of the window and comprising
a first film layer,
a first adhesive layer on the first film layer, and
a first masking pattern on the first adhesive layer and having a thickness of 0.1 to 10 μm,
wherein the window comprises a base substrate, and a printed pattern along a periphery of a surface of the base substrate, and wherein the first masking pattern comprises an opening masking pattern covering an opening in the printed pattern, and
wherein the first masking pattern comprises a UV curable ink.

18. The window member of claim 17, wherein the first masking pattern is printed directly on the first adhesive layer.

19. A method for fabricating a display device, the method comprising:
preparing a window member comprising a window including a base substrate and a printed pattern along a periphery of a surface of the base substrate and in which a protective film is attached to a surface of the base substrate; and
peeling off the protective film from the window,
wherein the protective film comprises a film layer, an adhesive layer on the film layer, and an edge masking pattern on the adhesive layer along an edge of the adhesive layer, the edge masking pattern being located between the adhesive layer and the window.

20. The method of claim 19, wherein the preparing the window member comprises: preparing the protective film, and attaching the protective film to the surface of the window, and
wherein the preparing the protective film comprises: preparing a film in which the adhesive layer is arranged on an entire surface of the film layer, and printing a UV curable ink on the adhesive layer to form the edge masking pattern.

* * * * *